United States Patent
Paz et al.

(10) Patent No.: US 11,539,557 B1
(45) Date of Patent: Dec. 27, 2022

(54) MULTI-LEVEL CODING FOR POWER EFFICIENT CHANNEL CODING

(71) Applicant: QUALCOMM Incorporated, San Diego, CA (US)

(72) Inventors: Daniel Paz, Geva Carmel (IL); Amit Bar-Or Tillinger, Tel-Aviv (IL); Michael Levitsky, Ehovot (IL); Assaf Touboul, Netanya (IL); Shay Landis, Hod Hasharon (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/644,631

(22) Filed: Dec. 16, 2021

(51) Int. Cl.
*H04L 25/49* (2006.01)
*H04L 1/00* (2006.01)
*H04L 1/18* (2006.01)

(52) U.S. Cl.
CPC .......... *H04L 25/4917* (2013.01); *H04L 1/005* (2013.01); *H04L 1/0041* (2013.01); *H04L 1/0058* (2013.01); *H04L 1/1812* (2013.01)

(58) Field of Classification Search
CPC ......... H04L 25/38; H04L 25/40; H04L 25/49; H04L 25/4917; H04L 1/005; H04L 1/0041; H04L 1/0058; H04L 1/1812
See application file for complete search history.

(56) References Cited

U.S. PATENT DOCUMENTS

| | | | | |
|---|---|---|---|---|
| 7,630,451 | B2* | 12/2009 | Collins | H04L 27/3488 455/60 |
| 8,194,796 | B2* | 6/2012 | Collins | H04L 27/3488 455/60 |
| 8,223,853 | B2* | 7/2012 | Vijayan | H04L 1/0045 377/34 |
| 8,411,806 | B1* | 4/2013 | Lee | H04L 25/03891 375/349 |
| 8,559,552 | B2* | 10/2013 | Wang | H04L 27/28 375/264 |
| 8,699,607 | B2* | 4/2014 | Seller | H04L 27/26524 375/267 |
| 8,711,994 | B2* | 4/2014 | Mergen | H04B 1/71072 375/349 |
| 8,718,204 | B1* | 5/2014 | Lee | H04L 25/03331 375/262 |
| 8,774,310 | B2* | 7/2014 | Khan | H04L 5/006 375/296 |

(Continued)

*Primary Examiner* — James M Perez
(74) *Attorney, Agent, or Firm* — Procopio, Cory, Hargreaves & Savitch

(57) ABSTRACT

A first wireless device may receive, from a second wireless device, a transmission associated with an MLC scheme. The MLC scheme may include a plurality of bits with at least one first bit corresponding to a first level of the plurality of bits and at least one second bit corresponding to a second level of the plurality of bits. The at least one first bit may be coded with a first level of complexity, but the at least one second bit may be coded with either the first level of complexity or a second level of complexity, where the first level of complexity may be a higher level of complexity than the second level of complexity. The first wireless device may decode the at least one first bit and the at least one second bit using a decoder having a corresponding level of complexity.

30 Claims, 16 Drawing Sheets

(56) References Cited

U.S. PATENT DOCUMENTS

| | | | | |
|---|---|---|---|---|
| 8,774,322 B2* | 7/2014 | Goldfarb | H04L 27/22 | 375/232 |
| 8,861,637 B2* | 10/2014 | Na | H04L 25/03343 | 375/232 |
| 8,917,796 B1* | 12/2014 | Mayrench | H04B 7/0697 | 375/267 |
| 8,995,568 B1* | 3/2015 | Wu | H04K 1/006 | 375/295 |
| 9,001,918 B2* | 4/2015 | Taori | H04L 27/2634 | 375/284 |
| 9,071,295 B1* | 6/2015 | Lee | H04L 25/03318 | |
| 9,483,413 B2* | 11/2016 | Dor | G06F 12/0246 | |
| 9,667,459 B1* | 5/2017 | Naim | H04L 5/0046 | |
| 10,084,581 B2* | 9/2018 | Sun | H04L 27/3488 | |
| 10,700,803 B2* | 6/2020 | Taherzadeh Boroujeni | H04L 27/2634 | |
| 11,032,558 B2* | 6/2021 | Myung | H04L 1/0058 | |
| 11,038,739 B1* | 6/2021 | Landis | H04B 1/1027 | |
| 11,218,352 B2* | 1/2022 | Park | H04L 65/611 | |
| 2003/0138056 A1* | 7/2003 | Uesugi | H04L 1/1893 | 375/262 |
| 2005/0111565 A1* | 5/2005 | Pons | H04L 1/208 | 714/792 |
| 2006/0232447 A1* | 10/2006 | Walker | H04W 52/0245 | 341/50 |
| 2009/0092174 A1* | 4/2009 | Wang | H04L 27/2604 | 375/132 |
| 2009/0220034 A1* | 9/2009 | Ramprashad | H04L 1/0048 | 375/341 |
| 2010/0027708 A1* | 2/2010 | Fukuda | H04L 25/4917 | 375/286 |
| 2010/0031118 A1* | 2/2010 | Blanksby | H03M 13/1145 | 714/752 |
| 2010/0296428 A1* | 11/2010 | Ho | H04L 27/34 | 370/312 |
| 2011/0194030 A1* | 8/2011 | Bae | H04H 20/42 | 348/E5.093 |
| 2011/0222462 A1* | 9/2011 | Ho | H04L 27/3488 | 370/312 |
| 2012/0076204 A1* | 3/2012 | Raveendran | H04N 21/631 | 375/E7.021 |
| 2012/0093218 A1* | 4/2012 | Chang | H04N 19/44 | 375/E7.126 |
| 2013/0205075 A1* | 8/2013 | Twitto | G06F 12/0246 | 365/185.11 |
| 2014/0029502 A1* | 1/2014 | Hong | H04N 21/2362 | 370/312 |
| 2015/0092879 A1* | 4/2015 | Mansour | H03M 5/18 | 375/286 |
| 2015/0139294 A1* | 5/2015 | Myung | H04L 1/0058 | 375/240.01 |
| 2015/0171983 A1* | 6/2015 | Kusashima | H04L 1/005 | 370/329 |
| 2015/0222332 A1* | 8/2015 | Helard | H04L 25/03286 | 375/299 |
| 2015/0358648 A1* | 12/2015 | Limberg | H04L 1/0052 | 725/109 |
| 2015/0372852 A1* | 12/2015 | Delaruelle | H04L 27/34 | 375/320 |
| 2016/0013897 A1* | 1/2016 | Sun | H04L 5/005 | 370/312 |
| 2016/0056918 A1* | 2/2016 | Miller | H04L 1/0045 | 714/776 |
| 2016/0087649 A1* | 3/2016 | Limberg | H03M 13/356 | 714/776 |
| 2016/0117256 A1* | 4/2016 | Dor | G06F 12/0246 | 711/103 |
| 2016/0197759 A1* | 7/2016 | Baek | H04L 1/0041 | 375/340 |
| 2016/0352462 A1* | 12/2016 | Oh | H04L 1/0071 | |
| 2017/0111198 A1* | 4/2017 | Park | H04L 1/0045 | |
| 2018/0042015 A1* | 2/2018 | Yin | H04L 1/1854 | |
| 2019/0007255 A1* | 1/2019 | Limberg | H04L 27/26524 | |
| 2019/0132171 A1* | 5/2019 | Limberg | H04L 1/0041 | |
| 2019/0199417 A1* | 6/2019 | Noh | H04L 27/26 | |
| 2019/0199572 A1* | 6/2019 | Limberg | H04L 5/0048 | |
| 2020/0119856 A1* | 4/2020 | Zhou | H04L 1/1854 | |
| 2020/0177307 A1* | 6/2020 | Pan | H04L 1/0045 | |
| 2020/0366317 A1* | 11/2020 | Myung | H03M 13/1111 | |
| 2021/0111940 A1* | 4/2021 | Huang | H04L 1/0003 | |
| 2021/0119840 A1* | 4/2021 | Landis | H04L 27/2605 | |
| 2021/0119846 A1* | 4/2021 | Landis | H04L 27/2634 | |
| 2021/0281466 A1* | 9/2021 | Loghin | H04L 1/0045 | |
| 2021/0288782 A1* | 9/2021 | Horn | H04W 72/0406 | |
| 2021/0314089 A1* | 10/2021 | Wu | H03M 13/356 | |
| 2021/0320956 A1* | 10/2021 | Berliner | H04N 19/159 | |
| 2022/0014316 A1* | 1/2022 | Levitsky | H04L 1/1864 | |
| 2022/0069941 A1* | 3/2022 | Levitsky | H03M 13/2707 | |
| 2022/0069947 A1* | 3/2022 | Levitsky | H04L 5/0055 | |
| 2022/0070842 A1* | 3/2022 | Levitsky | H04W 72/0413 | |
| 2022/0103399 A1* | 3/2022 | Dallal | H04L 27/2695 | |
| 2022/0167415 A1* | 5/2022 | Uziel | H04W 72/0406 | |
| 2022/0255778 A1* | 8/2022 | Paz | H04L 25/4917 | |

* cited by examiner

MULTI-LEVEL CODING FOR POWER EFFICIENT CHANNEL CODING

TECHNICAL FIELD

The present disclosure relates generally to communication systems, and more particularly, to encoding and decoding transmission messages between wireless devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a wireless device, such as a user equipment (UE) or a base station (BS), transmits an encoded message to another wireless device, decoding the channel code may be one of the highest power-consuming tasks. Reducing power consumption when decoding received messages may be advantageous.

To help a first wireless device consume less power, a second wireless device may transmit data to the first wireless device using a multi-level coding (MLC) scheme. The MLC scheme may have a plurality of bits with at least one first bit and at least one second bit, where the at least one first bit corresponds to a first level of the plurality of bits and the at least one second bit corresponds to a second level of the plurality of bits. A first level and a second level of complexity may be used to encode and decode the bits, where the first level of complexity is a higher level of complexity than the second level of complexity. Encoding and/or decoding bits using the first level of complexity may use more power than encoding and/or decoding bits using the second level of complexity.

The second wireless device may estimate whether to encode the at least one second bit of the MLC scheme using the second level of complexity or the first level of complexity. The second wireless device may encode the at least one first bit of the MLC scheme using the first level of complexity, and may encode the at least one second bit of the MLC scheme using the first level of complexity or the second level of complexity based on the estimation. The second wireless device may then transmit to the first wireless device at least one transmission associated with the MLC scheme that includes the encoded at least one first bit and the encoded at least one second bit. The first wireless device may receive, from the second wireless device, the encoded transmission associated with the MLC scheme. The first wireless device may decode the at least one encoded first bit of the MLC scheme corresponding to the first level using a decoder of the first level of complexity. The first wireless device may decode the at least one encoded second bit using a decoder of the first level of complexity if the at least one encoded second bit was coded using the coder of the first level of complexity, and may decode the at least one encoded second bit using a decoder of the second level of complexity if the at least one encoded second bit was coded using the coder of the second level of complexity. Decoding bits using the decoder of the second level of complexity may use less power than decoding bits using the decoder of the first level of complexity, as less complex code may utilize less power to decode.

In an aspect of the disclosure, a method, a computer-readable medium, and an apparatus for wireless communication at a first wireless device are provided. The apparatus may include a memory and at least one processor coupled to the memory. The at least one processor may be configured to receive, from a second wireless device, at least one transmission associated with an MLC scheme. The MLC scheme may include a plurality of bits with at least one first bit and at least one second bit. The at least one first bit may correspond to a first level of the plurality of bits, and the at least one second bit may correspond to a second level of the plurality of bits. The at least one processor may be further configured to decode the at least one first bit of the MLC scheme corresponding to the first level using a decoder of a first level of complexity. The at least one processor may be further configured to, upon decoding the at least one first bit, decode the at least one second bit of the MLC scheme using a decoder of a second level of complexity if the at least one second bit is coded using a coder of the second level of complexity and decode the at least one second bit of the MLC scheme using the decoder of the first level of complexity if the at least one second bit is coded using a coder of the first level of complexity. The first level of complexity may a higher level of complexity than the second level of complexity.

In an aspect of the disclosure, a method, a computer-readable medium, and an apparatus for wireless communication at a second wireless device are provided. The apparatus may include a memory and at least one processor coupled to the memory. The at least one processor may be configured to configure an MLC scheme including a plurality of bits with at least one first bit and at least one second bit. The at least one first bit may correspond to a first level of the plurality of bits and the at least one second bit may correspond to a second level of the plurality of bits. The at least one processor may be further configured to estimate whether to encode the at least one second bit of the MLC scheme using a second level of complexity or a first level of complexity. The first level of complexity may be a higher level of complexity than the second level of complexity. The at least one processor may be further configured to encode the at least one first bit of the MLC scheme using the first level of complexity. The at least one processor may be further configured to encode the at least one second bit of the MLC scheme using the second level of complexity or the first level of complexity based on the estimation. The at least one processor may be further configured to transmit, to a first wireless device, at least one transmission associated with the MLC scheme including the encoded at least one first bit and the encoded at least one second bit.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
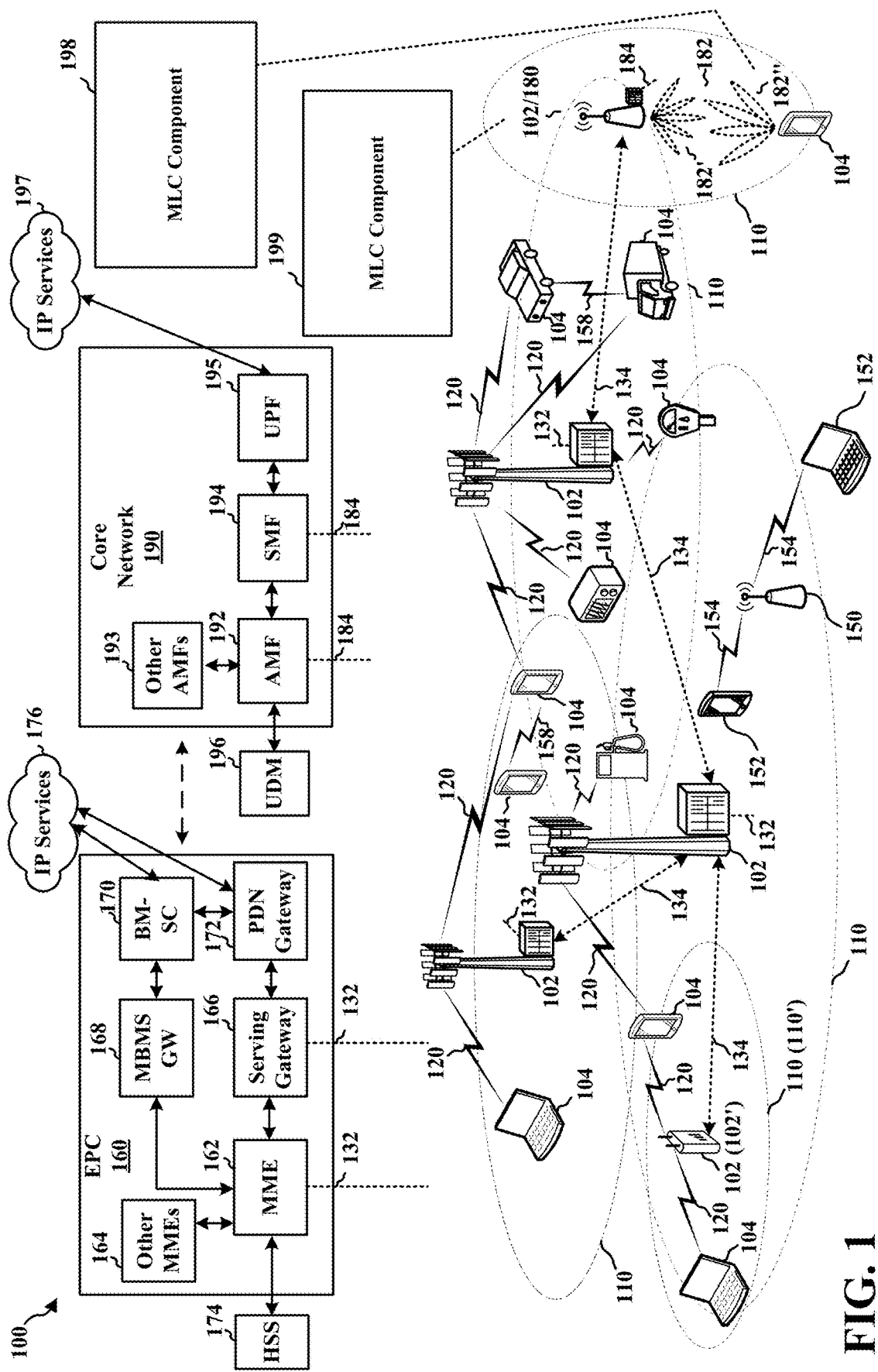
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an MLC component 198 configured to encode data using an MLC scheme and/or decode data using an MLC scheme. The BS 180 may similarly have an MLC component 199 configured to encode data using an MLC scheme and/or decode data using an MLC scheme. The UE 104 may communicate with another UE 104 or with the BS 180 using the MLC scheme, and the BS 180 may communicate with another BS 102, or with the UE 104 using the MLC scheme. The MLC scheme may assign at least two component codes for non-overlapping subsets of bits for a transmission, referred to as a level. A transmitting device, such as the UE 104 or the BS 180, may transmit encoded channel code to a receiving device, such as another UE 104 or another BS 102, using the MLC scheme.

The transmitting device may encode one or more bits of a first level of bits using a first level of complexity, and may encode one or more bits of a second level of bits using a first level of complexity or a second level of complexity. The transmitting device may transmit the encoded first level of bits and the encoded second level of bits to a receiving device. The receiving device may decode one or more bits of the encoded bits of the first level of bits using the first level of complexity, and may decode one or more bits of the encoded bits of the second level of bits using the first level of complexity if the bits were coded using the first level of complexity, or decode one or more bits of the encoded bits of the second level of bits using the second level of complexity if the bits were coded using the second level of complexity. Although the following description may be focused on 5G NR, the concepts described herein may be applicable to other similar areas, such as LTE, LTE-A, CDMA, GSM, and other wireless technologies.

Figure 2:
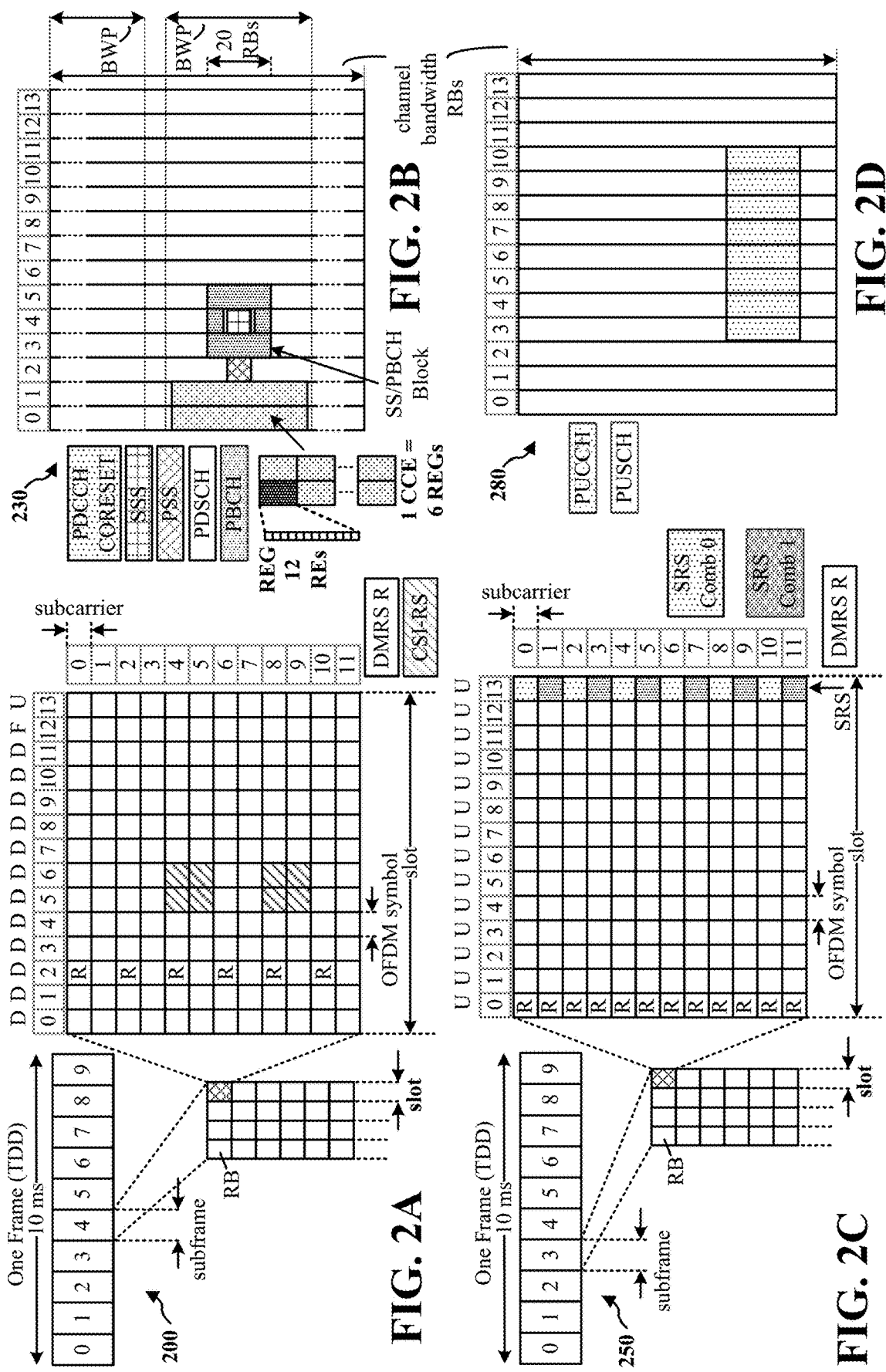
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to 2*15 kHz, where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
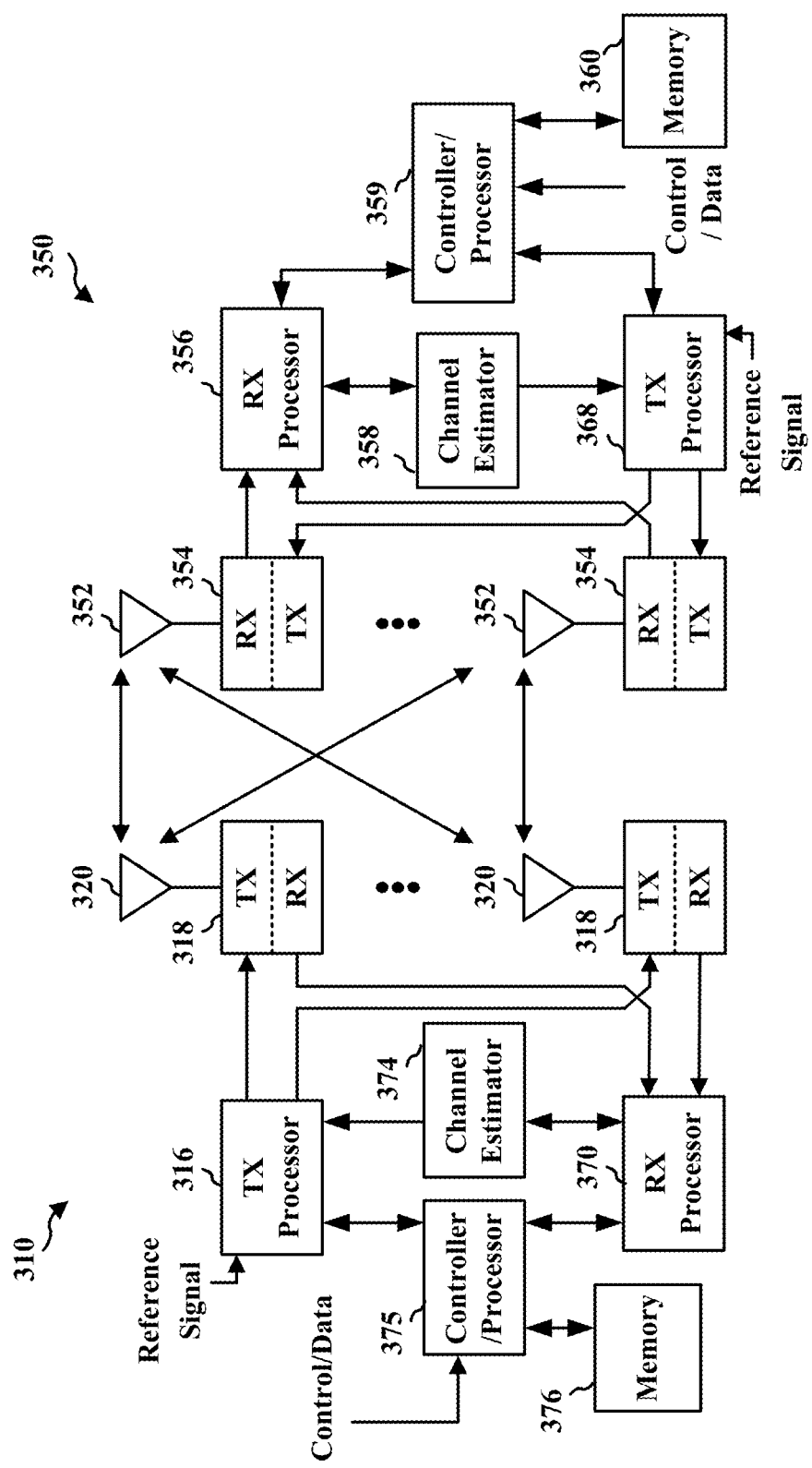
FIG. 3 is a diagram illustrating an example of a BS and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 of the UE 350 may be configured to perform aspects in connection with the MLC component 198 of FIG. 1.

At least one of the TX processor 316, the RX processor 370, and the controller/processor 375 of the BS 310 may be configured to perform aspects in connection with the MLC component 199 of FIG. 1.

When a wireless device, such as a UE or a BS, transmits an encoded message to another wireless device, decoding the channel code may be one of the highest power-consuming tasks. This may be particularly problematic for battery-powered UEs. Reducing power consumption when decoding received messages may be advantageous for certain devices, such as devices that use wireless standards such as the 5th generation new radio standard (5G-NR). An NR device may use a low-density parity-check (LDPC) decoder to decode an encoded channel code, which may use a lot of power. Problems with power consumption may become more prominent as such devices are able to use more bandwidth. For example, while an NR device may use bands like frequency range 1 (FR1) or frequency range 2 (FR2), future devices may communicate using different bands, such as frequency range 4 (FR4), frequency range 5 (FR5), or by using 6th generation standards. When data rates dramatically grow, it may be important to improve a device's power efficiency, even at the expense of spectral efficiency (SE), to provide feasible solutions in terms of power consumption. One or more power reduction methods may be used which utilize an MLC scheme to reduce the amount of power used to decode channel code. Such MLC-based methods may allow a device to achieve a better tradeoff between the power consumption of the decoding process and the spectral efficiency of a transmission.

Bit-interleaved coded modulation (BICM) may be used to perform channel encoding and decoding for a transmitting wireless device and a receiving wireless device, respectively. When using BICM, a device may interleave and encode the information bits before grouping the information bits into symbols and mapping the symbols to constellation points. A BICM scheme may use the same code to protect each bit in a constellation point, providing equal error protection for each bit. The information bits may be grouped into subsets of bits that are each encoded separately from one another.

An MLC scheme, sometimes referred to as unequal error protection, may be used to assign different component codes for non-overlapping subsets of bits. Each non-overlapping subset may be referred to as a level. For example, a string of eight bits '00100010' may be separated into a first level component code of '0010' and a second level component code of '0010'. While MLC schemes having two levels are disclosed herein, an MLC scheme may have more than two levels. When decoding encoded component code, a receiving device may use a multi-stage decoding (MSD) method or a parallel independent decoding (PID) method.

An MSD method may decode component code from one MLC level based on knowledge obtained from decoding component code from a previous MLC level. Such a scheme may be referred to as an MLC+MSD scheme. Since MLC+MSD schemes may decode each level serially, each additional level of an MLC+MSD scheme may add to the latency in decoding every level for a set of component codes. An MLC+MSD scheme may limit the number of levels to two in order to avoid high latency due to the MSD serial decoding process.

An MLC+MSD scheme may use partitioning information that provides information to a second level after decoding information in a first level. Corresponding labelling may support set partitioning in a manner that increases the minimum Euclidian distance of a resulting constellation subset such that the highest level has the largest minimal Euclidian distance. For example, for an MLC+MSD scheme of two levels, the minimum Euclidian distance of a second level of bits may be smaller than the minimum Euclidian distance of a first level of bits.

Figure 4:
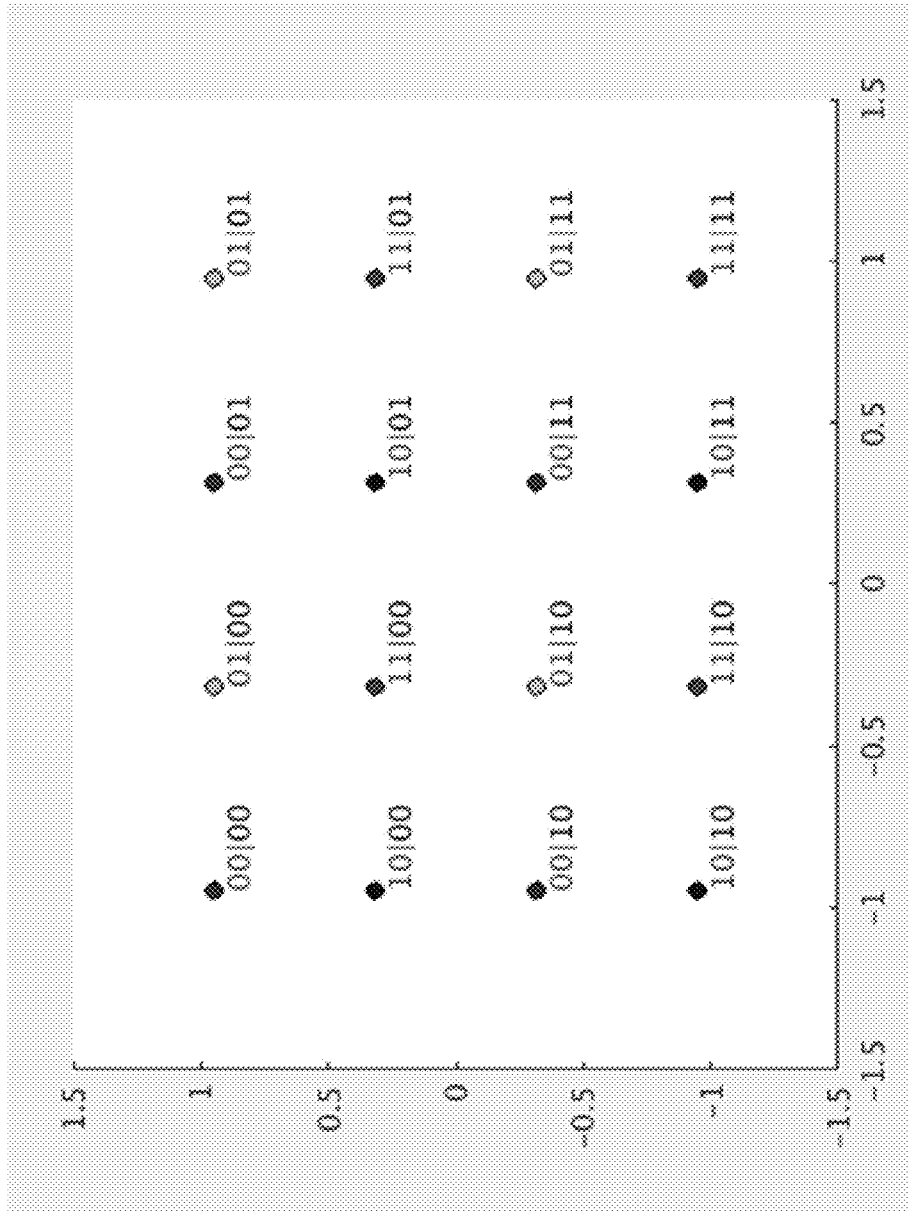
FIG. 4 is a diagram illustrating an example of multi-stage decoding (MSD) labeling that may be used for a 16 quadrature amplitude modulation (QAM) with two levels.

FIG. 4 illustrates an example of a constellation 400 for a 16-quadrature amplitude modulation (QAM) signal that may support set partitioning in a manner that increases the minimum Euclidian distance of a resulting constellation subset such that the highest level has the largest minimal Euclidian distance. The constellation 400 has 16 points, each consisting of four bits: '0000', '0001', '0010', '0011', '0100', '0101', '0110', '0111', '1000', '1001', '1010', '1011', '1100', '1101', '1110', and '1111'. The four bits may be divided into two levels where each level includes two bits. The first two bits may be designated as the first level, whereas the second two bits may be designated as the second level. The 16 points for the constellation 400 may be arranged such that the second level of bits has the largest minimal Euclidian distance. For example, for a 2-level MLC scheme, each subset may be Gray coded (i.e. only one bit may change between two adjacent constellation points).

By partitioning the bits in such a manner, use of constellation 400 may reduce the error rate when decoding the second level after decoding the first level, since any points that do not correspond with the decoded first level of bits may be ignored in constellation 400 when decoding the second level of bits. By ignoring such points, the constellation 400 having 16 points may have four possible points. As such, the first two bits in the first level of bits may utilize more protection than the second two bits in the second level of bits. For example, the first two bits in the first level may be encoded with a component code having a code rate (Rc) of 0.3, while the second two bits in the second level may be encoded with a component code having an Rc of 0.7, or even of 1. While the constellation 400 illustrates a constellation mapping for four bits of a 16-QAM signal, the same concepts to increase the minimum Euclidian distance of the highest level of bits may be applied to eight bits of a 256-QAM signal or even to 10 bits of a 1024-QAM signal. In other words, when applying an MLC+MSD scheme, the labelling of the constellation may be designed to support a constellation set partitioning such that the minimal Euclidian distance is increasing moving from the first (lowest) to the second (highest) MLC levels.

Figure 5:
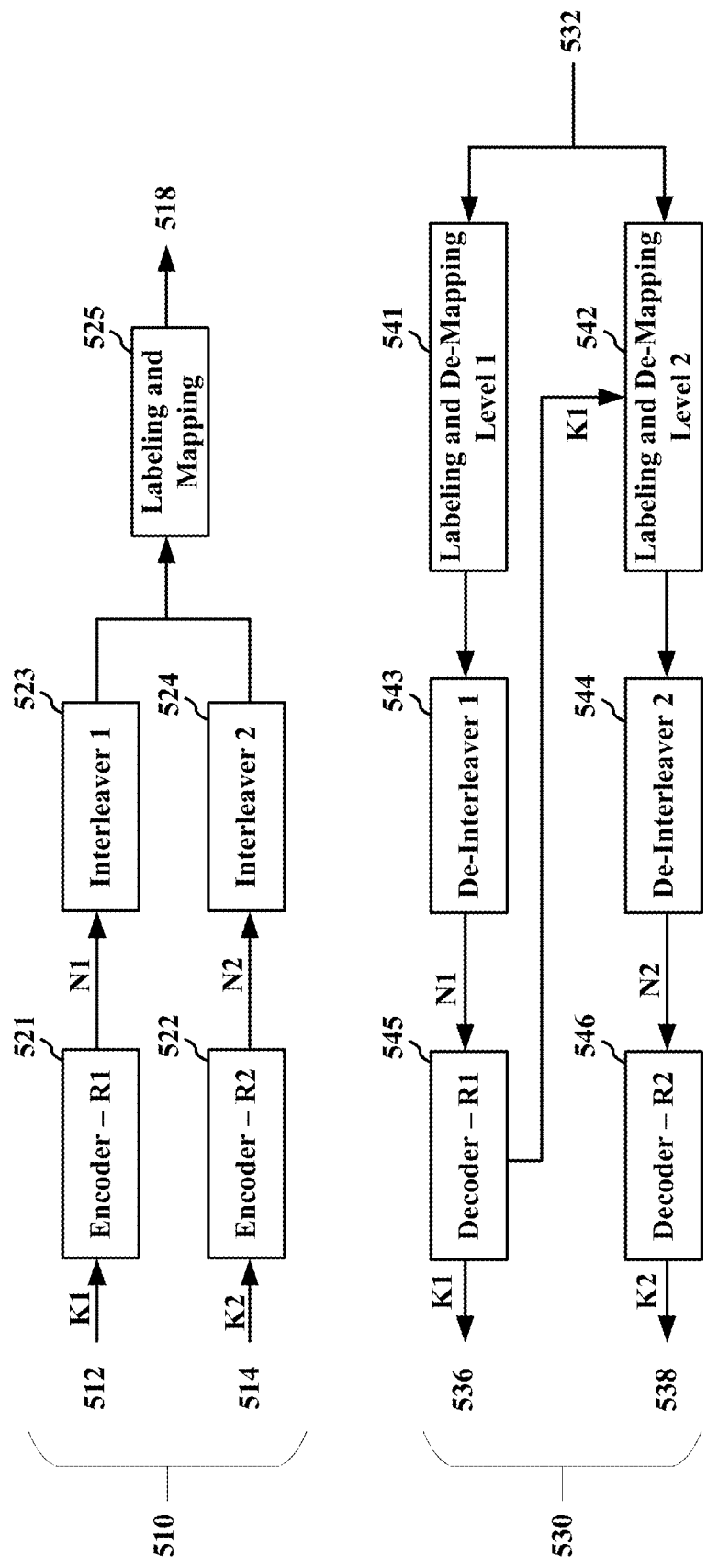
FIG. 5 is a diagram illustrating an example of a 2-level MLC+MSD encoding system and decoding system having one encoder per level and one decoder per level.

FIG. 5 is a diagram illustrating an example of a 2-level MLC+MSD encoding system and decoding system having one encoder per level and one decoder per level. The MLC+MSD scheme may assign different component codes for non-overlapping subsets of bits. For example, for a set of eight bits, an MLC+MSD may assign the first four most significant bits (MSB) to level 1 and the last four least significant bits (LSB) to level 2. The first 4 MSB may also be referred to as component code 1, or K1, while the last 4 LSB may also be referred to as component code 2, or K2. Encoded channel code may protect transmitted information bits. Encoded channel code may also add redundancy to the uncoded information bits to compensate for impairments, such as Gaussian noise, that may corrupt transmitted information.

A transmitting device 510 may have an encoder R1 521, an encoder R2 522, a first interleaver 523 (interleaver 1), a second interleaver 524 (interleaver 2), and a labeling and mapping module 525. The transmitting device 510 may process K1 using the input 512 of the encoder R1 521 and may process K2 using the input 514 of the encoder R2 522.

The encoder R1 521 may be configured to encode at least one bit of K1 using an encoder of a first level of complexity (e.g., Rc=0.3). Since Rc may calculated as a ratio between information bits and total bits transmitted, Rc may also represent a redundancy rate of additional bits transmitted above the minimum number of bits to transmit a component code. A lower Rc may also represent a component code that is better protected, and better able to withstand a low signal-to-noise ratio (SNR) condition. The encoder R1 521 may encode the component code K1 to produce an encoded component code N1.

The encoder R2 522 may be configured to encode at least one bit of K2 using an encoder of the first level of complexity (e.g., Rc=0.3) or a second level of complexity (e.g., Rc=0.7). The encoder R2 522 may encode the component code K2 to produce an encoded component code N2. Where the level of complexity of the encoder R1 521 is equal to the level of complexity of the encoder R2 522, the encoded component code N1 may be protected just as much as the encoded component code N2. The amount of power to encode N1 may also be the same as the amount of power to encode N2 (where K1 and K2 are the same number of bits). Where the level of complexity of the encoder R1 521 is less than the level of complexity of the encoder R2 522, the encoded component code N1 may be protected more than the encoded component code N2. The amount of power to encode N2 using an encoder of the second level of complexity may also be less than the amount of power to encode N2 if the encoder R2 522 used an encoder of the first level of complexity.

The first interleaver 523 may be configured to process the encoded component code N1, and the second interleaver 524 may be configured to process the encoded component code N2, and feed the interleaved encoded bits to the labeling and mapping module 525 to generate a transmission 518 to a receiving device 530.

The level of complexity of the encoder R1 521 may be configured to be at a higher level than the level of complexity of the encoder R2 522 in a variety of ways. For example, component code for the encoder R2 522 may be a lower complexity code type that may be focused mainly on higher code rate (i.e., Rc) options than the encoder R1 521. In another example, the encoding for the encoder R2 522 may be performed using a lower number of iterations than the encoding for the encoder R1 521. In yet another example, the encoding for the encoder R2 522 may be performed using one or more hard bits. The encoder R2 522 may not even use a channel code encoder, and may simply be configured to pass K2 through as N2 to its output. A combination of the aforementioned techniques may also be used to lower the complexity of the encoder R2 522 as compared to the encoder R1 521.

A receiving device 530 may have a labeling and de-mapping level 1 module 541, a labeling and de-mapping level 2 module 542, a first de-interleaver 543 (de-interleaver 1), a second de-interleaver 544 (de-interleaver 2), a decoder R1 545, and a decoder R2 546. The receiving device 530 may process a received transmission 532 using the labeling and de-mapping level 1 module 541 first, and then using the labeling and de-mapping level 2 module 542.

The labeling and de-mapping level 1 module 541 may process the received transmission 532 and feed the labeled and de-mapped bits to the first de-interleaver 543 to generate the encoded component code N1. The decoder R1 545 may be configured to decode at least one of bit of the encoded component code N1 using a decoder of the first level of complexity (e.g., Rc=0.3). The decoder R1 545 may have a decoder of the same level of complexity as the encoder R1 521. This may allow the decoder R1 545 to process the encoded component code N1 to generate K1 as a corollary to the encoder R1 521 processing K1 to generate the encoded component code N1.

The resultant K1 may be fed to the labeling and de-mapping level 2 module, which may process the received transmission 532 and feed the labeled and de-mapped bits to the second de-interleaver 544 to generate the encoded component code N2. The labeling and de-mapping level 2 module may be configured to ignore points on a constellation that do not correlate with the resultant K1 to decrease the number of potential points in the constellation when processing the level 2 channel code. The decoder R2 546 may be configured to decode at least one bit of the encoded component code N2 using a decoder of the first level of complexity (e.g., 0.3) if the encoded component code N2 was coded using a coder of the first level of complexity, or using a decoder of the second level of complexity (e.g., 0.7) if the encoded component code N2 was coded using a coder of the second level of complexity. The decoder R2 546 may have a decoder of the same level of complexity as the encoder R2 522. This may allow the decoder R2 546 to process the encoded component code N2 to generate K2 as a corollary to the encoder R2 522 processing K2 to generate the encoded component code N2.

Where the level of complexity of the decoder R1 545 is equal to the level of complexity of the decoder R2 546, the amount of power to decode N2 may be the same as the amount of power to encode N2 (where N1 and N2 are the same number of bits). Where the level of complexity of the decoder R1 545 is less than the level of complexity of the decoder R2 546, the amount of power to decode N2 using a decoder of the second level of complexity may also be less than the amount of power to decode N2 using a decoder of the first level of complexity. By using a decoder R2 546 having a higher level of complexity than the level of complexity of the decoder R1 545, the receiving device 530 may use less power to decode the channel code than if the receiving device 530 were using a traditional BICM encoding/decoding method having encoders/decoders of the same level of complexity for all bits. Where the Rc of the decoder R2 546 is set to 1, the decoder R2 546 may be replaced by a wire that directly connects the output 538 to the output of the second de-interleaver 544.

The decoded K1 536 from the decoder R1 545 and the decoded K2 538 from the decoder R2 546 may be juxtaposed (i.e., with K1 forming the first four MSB and K2 forming the last four LSB) to form the raw uncoded message sent by the transmitting device 510.

The level of complexity of the decoder R1 545 may be configured to be at a higher level than the level of complexity of the decoder R2 546 in a variety of ways. For example, component code for the decoder R2 546 may be a lower complexity code type that may be focused mainly on higher code rate (i.e., Rc) options than the decoder R1 545. In another example, the decoding for the decoder R2 546 may be performed using a lower number of iterations than the decoding for the decoder R1 545. In yet another example, the decoding for the decoder R2 546 may be performed using one or more hard bits. A combination of the aforementioned techniques may also be used to lower the complexity of the decoder R2 546 as compared to the decoder R1 545.

Figure 6:
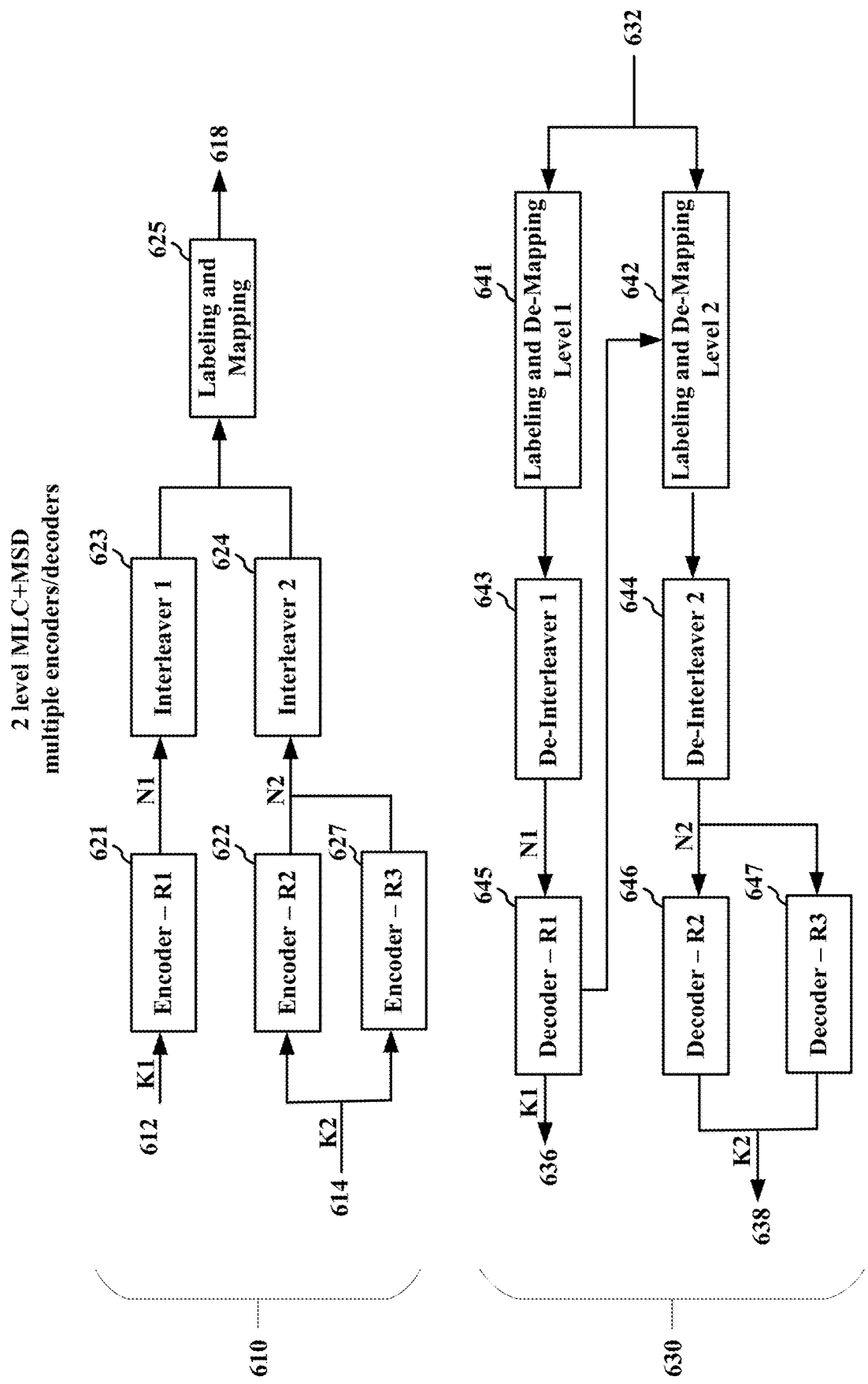
FIG. 6 is a diagram illustrating an example of a 2-level MLC+MSD encoding system and decoding system having one encoder for a first level, two encoders for a second level, one decoder for a first level, and two decoders for a second level.

FIG. 6 is a diagram illustrating an example of a 2-level MLC+MSD encoding system and decoding system having one encoder/decoder for level 1 bits and two encoders/decoders for level 2 bits. As in FIG. 5, the MLC+MSD scheme may assign different component codes for non-overlapping subsets of bits. Here, the MLC+MSD scheme may assign component codes for two levels of bits, where the first level of bits may be referred to as component code 1, or K1, while the second level of bits may also be referred to as component code 2, or K2.

A transmitting device 610 may have an encoder R1 621, an encoder R2 622, and encoder R3 627, a first interleaver 623 (interleaver 1), a second interleaver 624 (interleaver 2), and a labeling and mapping module 625. The transmitting device 610 may process K1 using the input 612 of the encoder R1 621 and may process K2 using the input 614 to route K2 to either of the encoder R2 622 or encoder R3 627.

The encoder R1 621 may be configured to encode at least one bit of K1 using an encoder of a first level of complexity (e.g., Rc=0.3). The encoder R1 621 may encode the component code K1 to produce an encoded component code N1.

The transmitting device 610 may be configured to either use the encoder R2 622 or the encoder R3 627 to encode at least one bit of K2. The encoder R2 622 may be configured to use an encoder of the first level of complexity (e.g., Rc=0.3) while the encoder R3 627 may be configured to use an encoder of a second level of complexity (e.g., Rc=0.7). The encoder of the second level of complexity may have a lower level of complexity than the encoder of the first level of complexity. By allowing the transmitting device 610 to use either the encoder R2 622 that may encode bits using the first level of complexity, or the encoder R2 627 that may encode bits using the second level of complexity, the transmitting device 610 may have the option of using more power to encode both the first level and the second level with equal levels of protection, or of conserving power to encode the first level with a higher level of protection than the second level. The level of complexity of the encoder R2 622 may be configured to be at a higher level than the level of complexity of the encoder R3 627 in a variety of ways, as explained in the above discussion with respect to the encoder R1 521 and the encoder R2 522 of FIG. 5.

The encoder R2 622 may encode the component code K2 to produce an encoded component code N2, while the encoder R2 627 may encode the component code K2 to produce an encoded component code N2.

The first interleaver 623 may be configured to process the encoded component code N1, and the second interleaver 624 may be configured to process the encoded component code N2, and feed the interleaved encoded bits to the labeling and mapping module 625 to generate a transmission 618 to a receiving device 630.

A receiving device 630 may have a labeling and de-mapping level 1 module 641, a labeling and de-mapping level 2 module 642, a first de-interleaver 643 (de-interleaver 1), a second de-interleaver 644 (de-interleaver 2), a decoder R1 645, a decoder R2 646, and a decoder R2 647. The receiving device 630 may process a received transmission 632 using the labeling and de-mapping level 1 module 641 first, and then using the labeling and de-mapping level 2 module 642.

The labeling and de-mapping level 1 module 641 may process the received transmission 632 and feed the labeled and de-mapped bits to the first de-interleaver 643 to generate the encoded component code N1. The receiving device 630 may be configured to either use the decoder R2 646 or the decoder R3 647 to decode at least one bit of N2.

The decoder R1 645 may be configured to decode at least one of bit of the encoded component code N1 using a decoder of the first level of complexity (e.g., Rc=0.3). The decoder R1 645 may have a decoder of the same level of complexity as the encoder R1 621. This may allow the decoder R1 645 to process the encoded component code N1 to generate K1 as a corollary to the encoder R1 621 processing K1 to generate the encoded component code N1.

The resultant K1 may be fed to the labeling and de-mapping level 2 module, which may process the received transmission 632 and feed the labeled and de-mapped bits to the second de-interleaver 644 to generate the encoded component code N2. The labeling and de-mapping level 2 module may be configured to ignore points on a constellation that do not correlate with the resultant K1 to decrease the number of potential points in the constellation when processing the level 2 channel code.

The decoder R2 646 may be configured to use a decoder of the first level of complexity (e.g., Rc=0.3) if the encoded component code N2 was coded using a coder of the first level of complexity while the decoder R3 647 may be configured to use a decoder of a second level of complexity (e.g., Rc=0.7) if the encoded component code N2 was coded using a coder of the second level of complexity. The decoder of the second level of complexity may have a lower level of complexity than the decoder of the first level of complexity. The decoder R2 646 may have a decoder of the same level of complexity as the encoder R2 622. This may allow the decoder R2 646 to process the encoded component code N2 to generate K2 as a corollary to the encoder R2 622 processing K2 to generate the encoded component code N2. Similarly, the decoder R3 647 may have a decoder of the same level of complexity as the encoder R3 627. This may allow the decoder R3 647 to process the encoded component code N2 to generate K2 as a corollary to the encoder R3 627 processing K2 to generate the encoded component code N2.

When the receiving device 630 uses the decoder R2 646 to decode the encoded component code N2, the receiving device 630 may be using more power than when the receiving device 630 uses the decoder R3 647 to decode the encoded component code N2. The level of complexity of the decoder R2 646 may be configured to be at a higher level than the level of complexity of the decoder R3 647 in a variety of ways, as explained in the above discussion with respect to the decoder R1 545 and the decoder R2 546 of FIG. 5. Where the Rc of the decoder R3 647 is set to 1, the decoder R3 647 may be replaced by a wire that directly connects the output 638 to the output of the second de-interleaver 644.

The decoded K1 636 from the decoder R1 645 and the decoded K2 638 from one of the decoder R2 646 or the decoder R3 647 may be juxtaposed (i.e., with K1 forming the first set of bits and K2 forming the second set of bits) to form the raw uncoded message sent by the transmitting device 610.

The level of complexity of the decoder R2 646 may be configured to be at a higher level than the level of complexity of the decoder R3 647 in a variety of ways, as discussed above with respect to the level of complexity of the decoder R1 545 to be at a higher level than the level of complexity of the decoder R2 546 in FIG. 5.

In contrast to the MSD method, a PID method may decode each MLC level independently without applying the knowledge obtained from a previous level of decoding. Such a scheme may be referred to as an MLC+PID scheme. The constellation used for a PID method may not need to use subset partitioning. Where the Rc of the decoder R2 546 is set to 1, the decoder R2 546 may be replaced by a wire that directly connects the output 538 to the output of the second de-interleaver 544.

Figure 7:
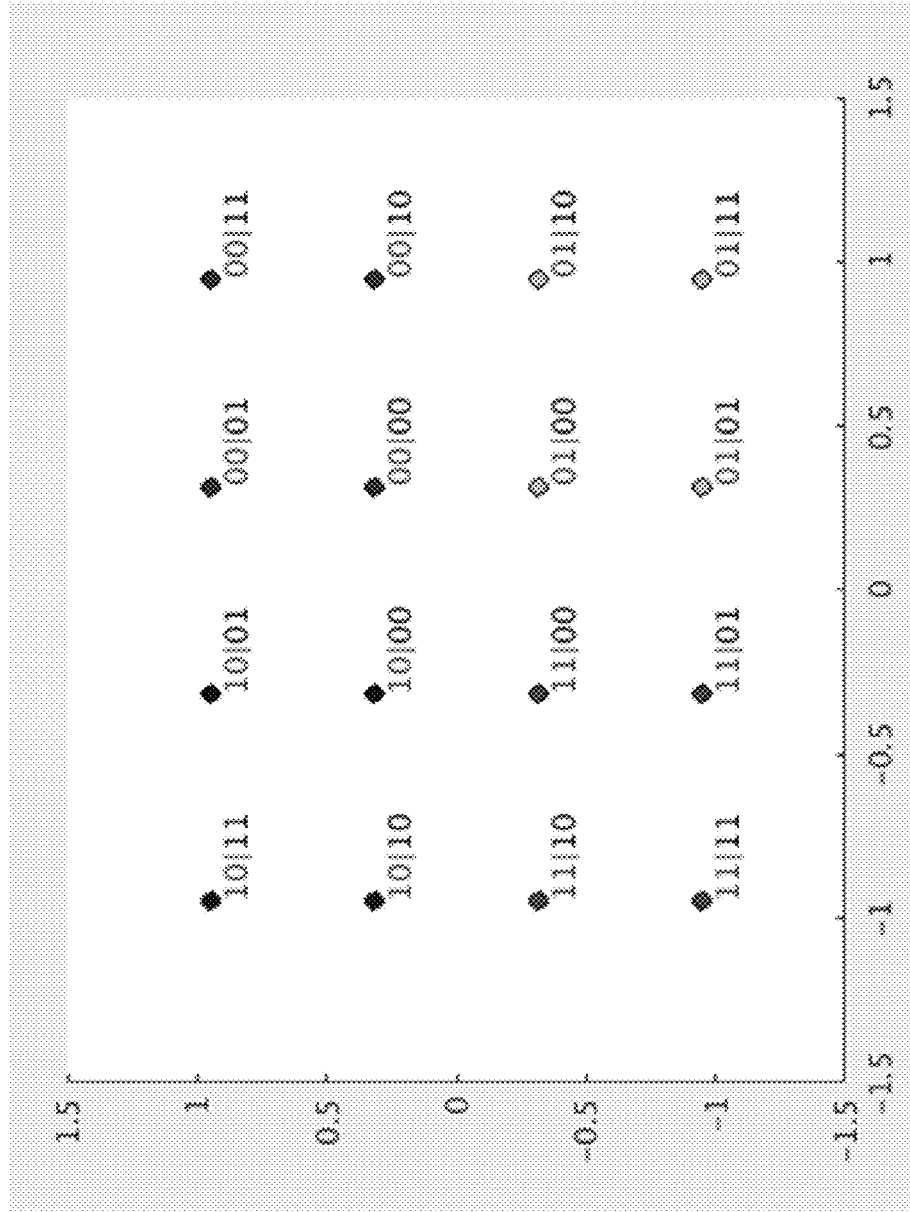
FIG. 7 is a diagram illustrating an example of parallel independent decoding (PID) labeling that may be used for a 16 QAM with two levels.

FIG. 7 illustrates an example of a constellation 700 for a 16 QAM signal that does not use subset partitioning. The constellation 700 also has 16 points, each consisting of four bits: '0000', '0001', '0010', '0011', '0100', '0101', '0110', '0111', '1000', '1001', '1010', '1011', '1100', '1101', '1110', and '1111'. The four bits may be divided into two levels where each level includes two bits. The first two bits may be designated as the first level, whereas the second two bits may be designated as the second level. The 16 points for the constellation 700 are arranged using Gray labeling subsets where the protection level of each level may be approximately equal.

Figure 8:
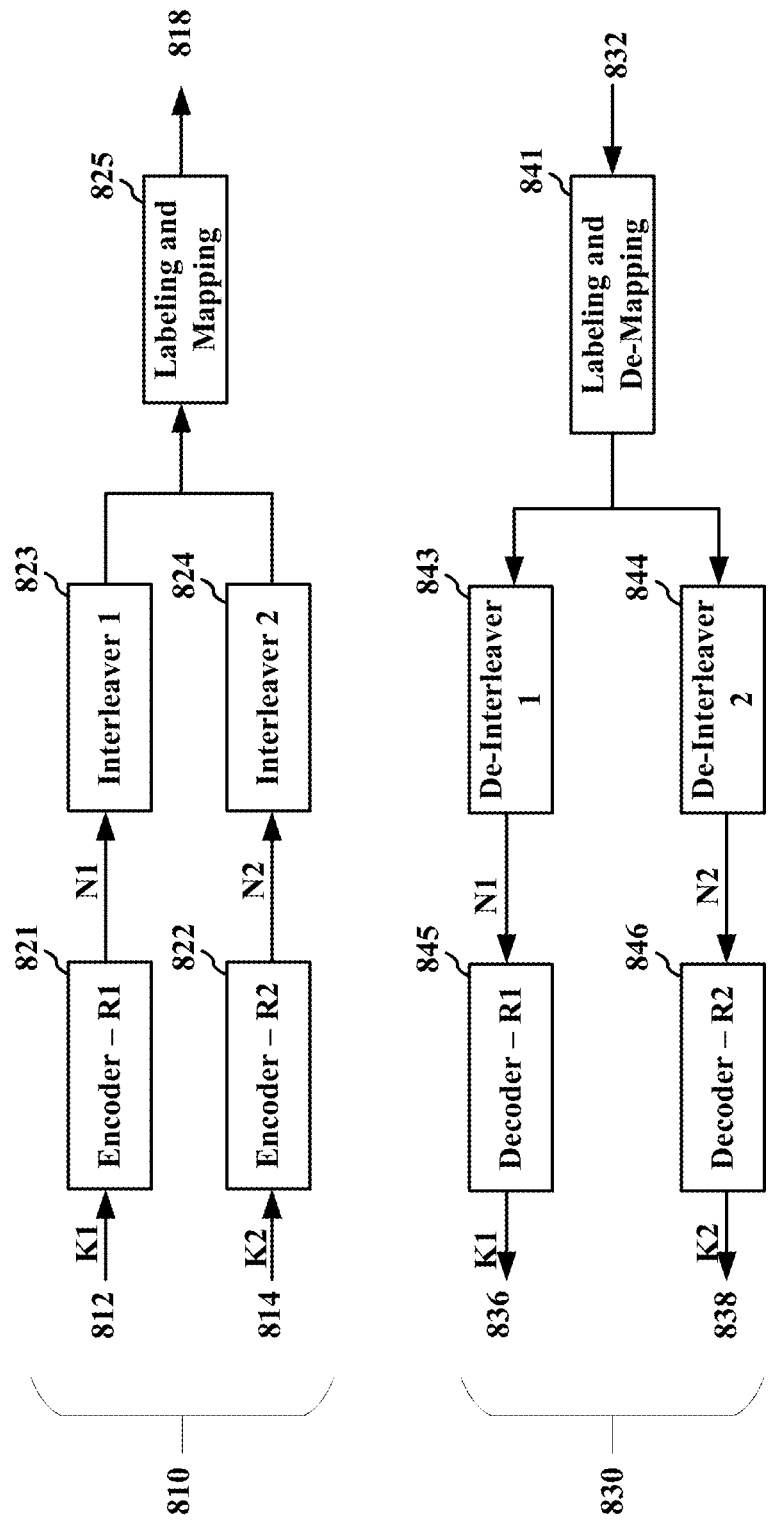
FIG. 8 is a diagram illustrating an example of a 2-level MLC+PID encoding system and decoding system having one encoder per level and one decoder per level.

FIG. 8 is a diagram illustrating an example of a 2-level MLC+PID encoding system and decoding system having one encoder per level and one decoder per level. The MLC+PID scheme may assign different component codes for non-overlapping subsets of bits. For example, for a set of 8 bits, an MLC+PID may assign the first 4 most significant bits (MSB) to level 1 and the last 4 least significant bits (LSB) to level 2. The first 4 MSB may also be referred to as component code 1, or K1, while the last 4 LSB may also be referred to as component code 2, or K2.

A transmitting device 810 may have an encoder R1 821, an encoder R2 822, a first interleaver 823 (interleaver 1), a second interleaver 824 (interleaver 2), and a labeling and mapping module 825. The transmitting device 810 may process K1 using the input 812 of the encoder R1 821 and may process K2 using the input 814 of the encoder R2 822.

The encoder R1 821 may be configured to encode at least one bit of K1 using an encoder of a first level of complexity (e.g., Rc=0.3). The encoder R1 821 may encode the component code K1 to produce an encoded component code N1.

The encoder R2 822 may be configured to encode at least one bit of K2 using an encoder of the first level of complexity (e.g., Rc=0.3) or a second level of complexity (e.g., Rc=0.8). The encoder R2 822 may encode the component code K2 to produce an encoded component code N2. Where the Rc of the encoder R1 821 is equal to the Rc of the encoder R2 822, the encoded component code N1 may be protected just as much as the encoded component code N2. The amount of power used to encode N1 may also be the same as the amount of power to encode N2 (where K1 and K2 are the same number of bits). Where the Rc of the encoder R1 821 is less than the Rc of the encoder R2 822, the encoded component code N1 may be protected more than the encoded component code N2. The amount of power used to encode N2 using an encoder of the second level of complexity may also be less than the amount of power used to encode N2 if the encoder R2 822 used an encoder of the first level of complexity.

The first interleaver 823 may be configured to process the encoded component code N1, and the second interleaver 824 may be configured to process the encoded component code N2, and feed the interleaved encoded bits to the labeling and mapping module 825 to generate a transmission 818 to a receiving device 830.

The level of complexity of the encoder R1 821 may be configured to be at a higher level than the level of complexity of the encoder R2 822 in a variety of ways similar to that of the encoder R2 522 and the encoder R1 521 of FIG. 5, respectively.

A receiving device 830 may have a labeling and de-mapping module 841, a first de-interleaver 843 (de-interleaver 1), a second de-interleaver 844 (de-interleaver 2), a decoder R1 845, and a decoder R2 846. The receiving device 830 may process a received transmission 832 using the labeling and de-mapping module 541, and feed a first set of bits to the first de-interleaver 843 to generate the encoded component code N1 and a second set of bits to the second de-interleaver 844 to generate the encoded component code N2.

The decoder R1 845 may be configured to decode at least one of bit of the encoded component code N1 using a decoder of the first level of complexity (e.g., Rc=0.3). The decoder R1 845 may have a decoder of the same level of complexity as the encoder R1 821. This may allow the decoder R1 845 to process the encoded component code N1 to generate K1 as a corollary to the encoder R1 821 processing K1 to generate the encoded component code N1.

The decoder R2 846 may be configured to decode at least one bit of the encoded component code N2 using a decoder of the first level of complexity (e.g., Rc=0.3) if the encoded component code N2 was coded using a coder of the first level of complexity, or using a decoder of the second level of complexity (e.g., Rc=0.7) if the encoded component code N2 was coded using a coder of the second level of complexity. The first level of complexity may be more complex than the second level of complexity. The decoder R2 846 may have a decoder of the same level of complexity as the encoder R2 822. This may allow the decoder R2 846 to process the encoded component code N2 to generate K2 as a corollary to the encoder R2 822 processing K2 to generate the encoded component code N2.

Where the level of complexity of the decoder R1 845 is equal to the level of complexity of the decoder R2 846, the amount of power used to decode N2 may be the same as the amount of power used to encode N2 (where N1 and N2 are the same number of bits). Where the level of complexity of the decoder R1 845 is less than the level of complexity of the decoder R2 846, the amount of power used to decode N2 using a decoder of the second level of complexity may also be less than the amount of power used to decode N2 using a decoder of the first level of complexity. By using a decoder R2 846 having a higher level of complexity than the level of complexity of the decoder R1 845, the receiving device 830 may use less power to decode the channel code than if the receiving device 830 were using a traditional BICM encoding/decoding method having encoders/decoders of the same level of complexity for all bits.

The decoded K1 836 from the decoder R1 845 and the decoded K2 838 from the decoder R2 846 may be juxtaposed (i.e., with K1 forming the first four MSB and K2 forming the last four LSB) to form the raw uncoded message sent by the transmitting device 810.

The level of complexity of the decoder R1 845 may be configured to be at a higher level than the level of complexity of the decoder R2 846 in a variety of ways similar to that of the decoder R2 546 and the decoder R1 545 of FIG. 5, respectively.

Figure 9:
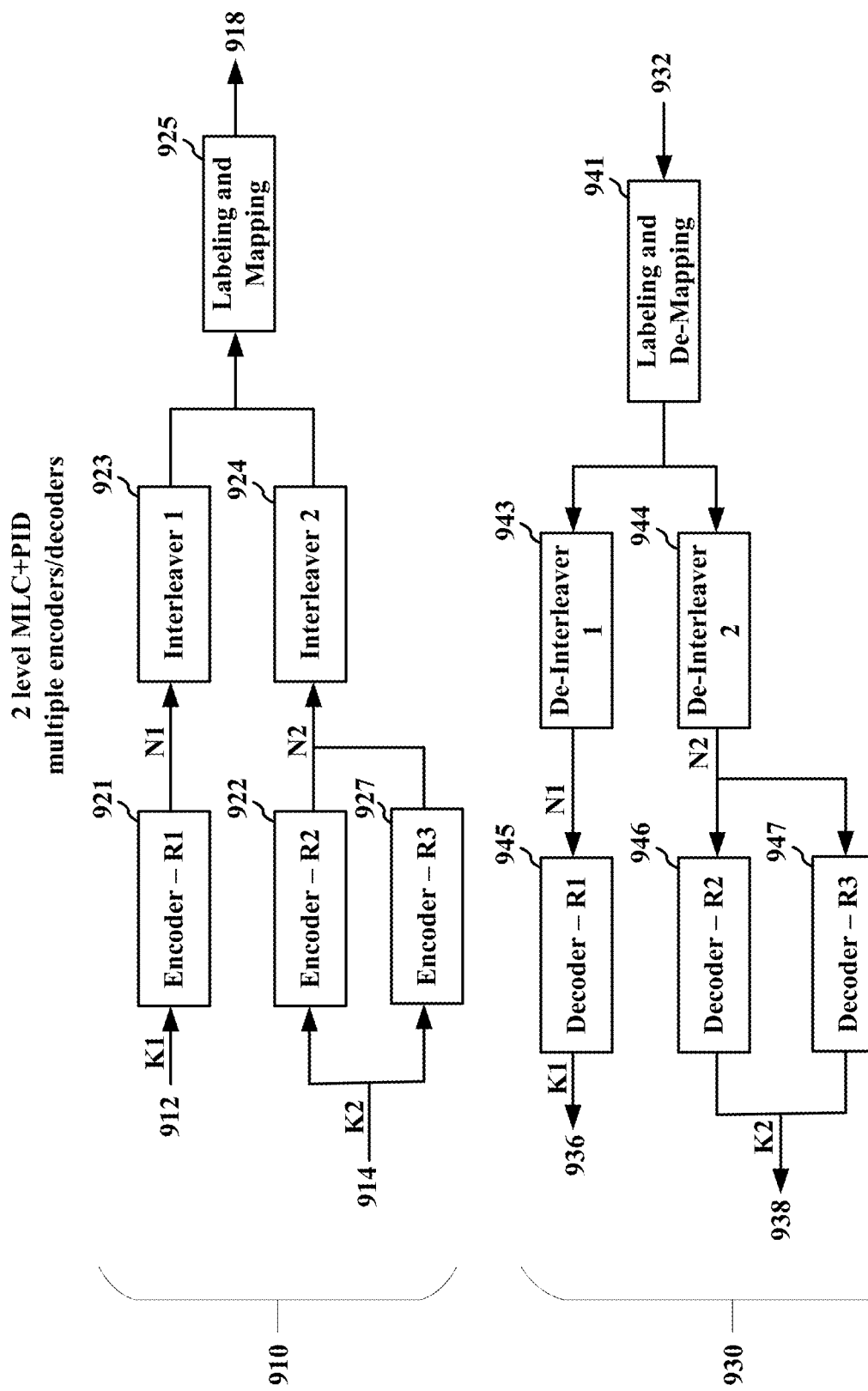
FIG. 9 is a diagram illustrating an example of a 2-level MLC+PID encoding system and decoding system having one encoder for a first level, two encoders for a second level, one decoder for a first level, and two decoders for a second level.

FIG. 9 is a diagram illustrating an example of a 2-level MLC+PID encoding system and decoding system having one encoder/decoder for level 1 bits and two encoders/decoders for level 2 bits. As in FIG. 8, the MLC+PID scheme may assign different component codes for non-overlapping subsets of bits. Here, the MLC+PID scheme may assign component codes for two levels of bits, where the first level of bits may be referred to as component code 1, or K1, while the second level of bits may also be referred to as component code 2, or K2.

A transmitting device 910 may have an encoder R1 921, an encoder R2 922, and encoder R3 927, a first interleaver 923 (interleaver 1), a second interleaver 924 (interleaver 2), and a labeling and mapping module 925. The transmitting device 910 may process K1 using the input 912 to encoder R1 921 and may process K2 using the input 914 to route K2 to either of the encoder R2 922 or encoder R3 927.

The encoder R1 921 may be configured to encode at least one bit of K1 using an encoder of a first level of complexity (e.g., Rc=0.3). The encoder R1 921 may encode the component code K1 to produce an encoded component code N1.

The transmitting device 910 may be configured to either use the encoder R2 922 or the encoder R3 927 to encode at least one bit of K2. The encoder R2 922 may be configured to use an encoder of the first level of complexity (e.g., Rc=0.3) while the encoder R3 927 may be configured to use an encoder of a second level of complexity (e.g., Rc=0.7). The encoder of the second level of complexity may have a lower level of complexity than the encoder of the first level of complexity. By allowing the transmitting device 910 to use either the encoder R2 922 that may encode bits using the first level of complexity, or the encoder R2 927 that may encode bits using the second level of complexity, the transmitting device 910 may have the option of using more power to encode both the first level and the second level with equal levels of protection, or of conserving power to encode the first level with a higher level of protection than the second level. The level of complexity of the encoder R2 922 may be configured to be at a higher level than the level of complexity of the encoder R3 927 in a variety of ways, as explained in the above discussion with respect to the encoder R1 521 and the encoder R2 522 of FIG. 5.

The encoder R2 922 may encode the component code K2 to produce an encoded component code N2, while the encoder R2 927 may encode the component code K2 to produce an encoded component code N2.

The first interleaver 923 may be configured to process the encoded component code N1, and the second interleaver 924 may be configured to process the encoded component code N2, and feed the interleaved encoded bits to the labeling and mapping module 925 to generate a transmission 918 to a receiving device 930.

The receiving device 930 may process a received transmission 932 using the labeling and de-mapping module 941, and feed a first set of bits to the first de-interleaver 943 to generate the encoded component code N1 and a second set of bits to the second de-interleaver 944 to generate the encoded component code N2. The receiving device 930 may be configured to either use the decoder R2 946 or the decoder R3 947 to decode at least one bit of N2.

The decoder R1 945 may be configured to decode at least one of bit of the encoded component code N1 using a decoder of the first level of complexity (e.g., Rc=0.3). The decoder R1 945 may have a decoder of the same level of complexity as the encoder R1 921. This may allow the decoder R1 945 to process the encoded component code N1 to generate K1 as a corollary to the encoder R1 921 processing K1 to generate the encoded component code N1.

The decoder R2 946 may be configured to use a decoder of the first level of complexity (e.g., Rc=0.3) if the encoded component code N2 was coded using a coder of the first level of complexity while the decoder R3 947 may be configured to use a decoder of a second level of complexity (e.g., Rc=0.7) if the encoded component code N2 was coded using a coder of the second level of complexity. The decoder of the second level of complexity may have a lower level of complexity than the decoder of the first level of complexity. The decoder R2 946 may have a decoder of the same level of complexity as the encoder R2 922. This may allow the decoder R2 946 to process the encoded component code N2 to generate K2 as a corollary to the encoder R2 922 processing K2 to generate the encoded component code N2. Similarly, the decoder R3 947 may have a decoder of the same level of complexity as the encoder R3 927. This may allow the decoder R3 947 to process the encoded component code N2 to generate K2 as a corollary to the encoder R3 927 processing K2 to generate the encoded component code N2. The level of complexity of the decoder R2 946 may be configured to be at a higher level than the level of complexity of the decoder R3 947 in a variety of ways, as discussed above with respect to the level of complexity of the decoder R1 545 to be at a higher level than the level of complexity of the decoder R2 546 in FIG. 5.

When the receiving device 930 uses the decoder R2 946 to decode the encoded component code N2, the receiving device 930 may be using more power than when the receiving device 930 uses the decoder R3 947 to decode the encoded component code N2. The level of complexity of the decoder R2 946 may be configured to be at a higher level than the level of complexity of the decoder R3 947 in a variety of ways, as explained in the above discussion with respect to the decoder R1 545 and the decoder R2 546 of FIG. 5.

The decoded K1 936 from the decoder R1 945 and the decoded K2 938 from one of the decoder R2 946 or the decoder R3 947 may be juxtaposed (i.e., with K1 forming the first set of bits and K2 forming the second set of bits) to form the raw uncoded message sent by the transmitting device 910.

The MLC+MSD scheme and the MLC+PID scheme may be more or less suitable and/or more or less effective depending upon the scenario and/or channel condition. For example, the MLC+MSD scheme may be more appropriate for channel conditions that closely match an additive white Gaussian noise (AWGN) channel model while the MLC+PID scheme may be more appropriate for channel conditions that closely match a fading channel model.

In THz communication, a higher weight may be given to reducing power consumption than maximizing SE, allowing for some SE loss in exchange for a reduction in power consumption. When using an MLC scheme, one or more devices that transmit encoded channel code may be configured to allow for a constrained performance loss in terms of SE in favor of power reduction by using one or more power efficient MLC scheme alternatives as opposed to a BICM scheme. An MLC+MSD scheme may also be more appropriate for flat channels, and by extension more appropriate for sub-THz channels, as they may have a higher likelihood of being flat channels and/or may have a higher likelihood of having a narrow beam. In addition, the number of bits allocated to each level and the level of complexity for each encoder and/or decoder may be adjusted based on an SNR region in order to maximize SE. For example, the Rc for an encoder/decoder may be configured as a function of a SNR region, as explained in more detail below. When using an MLC+MSD scheme, the Rc of an encoder/decoder for the highest level may even be set to 1 (i.e., the last x bits may not be encoded before transmission). Bits that are not encoded may also be referred to as uncoded bits.

As explained above, when using an MLC+MSD scheme, a constellation used may be configured to have the minimal Euclidian distance between points increase as the level increases. The measured SE of transmissions may change (e.g. increase or decrease) when using an MLC+MSD scheme where one or more bits are uncoded. The number of bits that are uncoded for an MLC+MSD scheme (i.e., number of bits for level 2 of a 2-level MSD scheme where the level 2 bits are uncoded) may also be adjusted as a function of SNR to optimize SE. For example, below a first threshold SNR (e.g., 18), the last 2 bits of a set of 6-bits may be configured to be uncoded, above a first threshold SNR (e.g., 18) and below a second threshold SNR (e.g., 25), the last 4 bits of a set of 8 bits may be configured to be uncoded, and above a second threshold SNR (e.g., 25), the last 6 bits of a set of 8 bits may be configured to be uncoded.

Figures 10A, 10B:
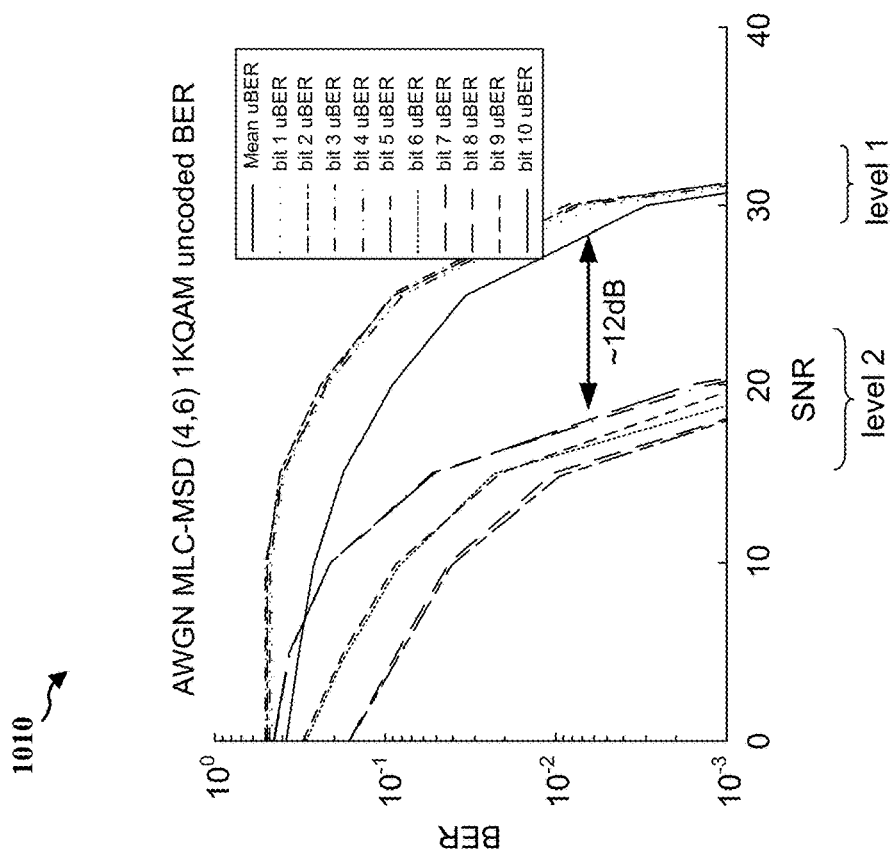
FIG. 10A is a plot graph of bit error rate (BER) and signal-to-noise ratio (SNR) for uncoded BER when using a 2-level MLC+MSD (4,6) scheme.
FIG. 10B is a plot graph of BER and SNR for uncoded BER when using a 2-level MLC+MSD (6,4) scheme.

FIG. 10A shows a plot graph 1010 showing measured bit error rate (BER) and SNR levels for a modeled AWGN channel for various simulated uncoded BER (uBER) inputs when using a 2-level MLC+MSD (4,6) scheme with a 1024 QAM signal. An MLC+MSD (x, y) scheme means that the first level of channel code has x-bits and the second level of channel code has y-bits. Therefore, the MLC+MSD (4,6) scheme has a first level of channel code having 4-bits and a second level of channel code having 6-bits. The MLC+MSD (4,6) scheme may support set partitioning in a manner that increases the minimum Euclidian distance of a resulting constellation subset such that second level of channel code having 6-bits has the largest minimal Euclidian distance. The uBER bit may not be passed through a channel decoder, and may be used as a proxy to derive an appropriate Rc value to use.

As shown by the plot graph 1010, the level 2 bits (bits 5, 6, 7, 8, 9, and 10) may be grouped together having a low BER value with comparatively lower SNR values as compared to the level 1 bits, and the level 1 bits (bits 1, 2, 3, and 4) may be grouped together having a low BER value with comparatively higher SNR values as compared to the level 1. The protection for the level 2 bits may not be very high since they have comparatively lower BER values. So long as the SNR is above about 20, it may be possible to work with uncoded level 2 bits without degrading the overall BER characteristics. An estimated or measured SNR of above 20 may then trigger use of the MLC-MSD (4,6) scheme modeled in the plot graph 1010 of FIG. 10A.

FIG. 10B shows a plot graph 1020 showing measured BER and SNR levels for a modeled AWGN channel for various simulated uBER inputs when using a 2-level MLC+MSD (6,4) scheme with a 1024 QAM signal. The MLC+MSD (6,4) scheme may have a first level of channel code having 6-bits and a second level of channel code having 4-bits. The MLC+MSD (6,4) scheme may support set partitioning in a manner that increases the minimum Euclidian distance of a resulting constellation subset such that second level of channel code having 4-bits has the largest minimal Euclidian distance. As in the plot graph 1010, the uBER may not be passed through a channel decoder, and may be used as a proxy to derive an appropriate Rc value to use.

As shown by the plot graph 1020, the level 2 bits (bits 7, 8, 9, and 10) may be grouped together having a low BER rate with comparatively lower SNR values as compared to the level 1 bits, and the level 1 bits (bits 1, 2, 3, 4, 5, and 6) may be grouped together having a low BER rate with comparatively higher SNR values as compared to the level 1. This shows that, so long as the SNR is above about 13, it may be possible to work with uncoded level 2 bits without degrading the overall BER characteristics. An estimated or measured SNR of below 20 and above 13 may then trigger use of the MLC-MSD (6,4) scheme modeled in the plot graph 1020 of FIG. 10B.

Comparing the plot graph 1010 against the plot graph 1020, it may be possible to use an MLC+MSD (6,4) scheme with lower SNR values than with an MLC+MSD (4,6) scheme. However, the MLC+MSD (4,6) scheme may use less power to decode channel code than the MLC+MSD (6,4) scheme, as the MLC+MSD (4,6) scheme has more uncoded bits than the MLC+MSD (6,4) scheme.

Figure 11:
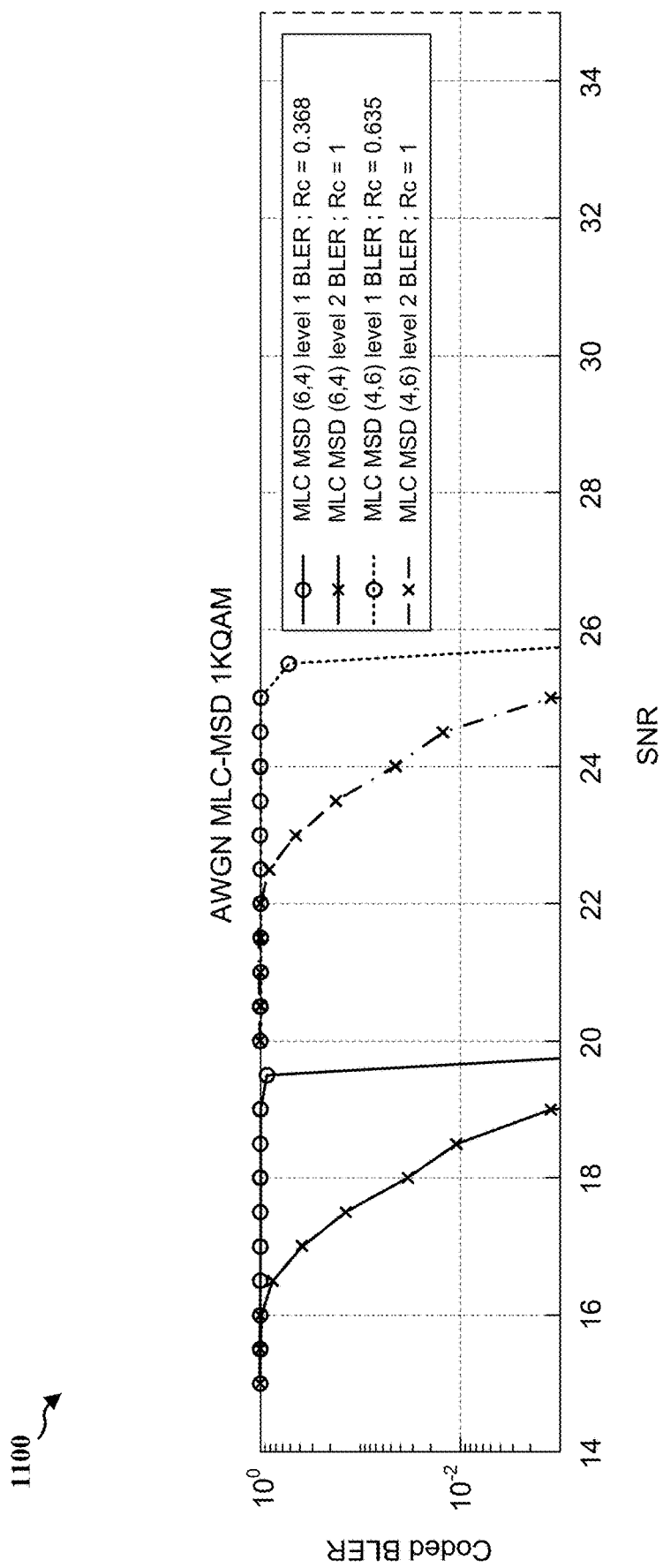
FIG. 11 is a plot graph of coded block error rate (BLER) and SNR for code rates when using a 2-level MLC+MSD (4,6) scheme vs. a 2-level MLC+MSD (6,4) scheme.

FIG. 11 shows a plot graph 1100 showing measured block error rate (BLER) levels and SNR levels for a modeled AWGN channel for various simulated Rc inputs used to encode and decode level 1 bits and level 2 bits when using a 2-level MLC+MSD (6,4) scheme with a 1024 QAM signal and when using a 2-level MLC+MSD (6,4) scheme with a 1024 QAM signal.

As shown in the plot graph plot graph 1100, the Rc for encoding/decoding level 1 bits for the MLC+MSD (6,4) scheme is 0.368 and the Rc for encoding/decoding level 2 bits for the MLC+MSD (6,4) scheme is 1 (all of the level 2 bits are uncoded). Using these Rc values, the coded BLER values may drop to lower values in scenarios where the SNR is greater than 20. Leaving the level 2 bits uncoded may produce a compromised slope as shown, which does not drop as cleanly as the slope for the coded level 1 bits. Additional test Rc values for encoding/decoding the level 1 bits may be simulated to determine a highest Rc value for encoding/decoding the level 1 bits where the uncoded level 2 BLER may have a better SNR ratio as compared to the coded level 1 BLER. Determining this value may reveal a lower functional SNR threshold that the MLC+MSD (6,4) scheme operates at with low coded BLER values. Ensuring that the uncoded level 2 BLER is better than the coded level 1 BLER may ensure that the level 2 bits do not dominate overall BLER statistics of the demodulation.

The plot graph plot graph 1100 also shows that the Rc for encoding/decoding level 1 bits for the MLC+MSD (4,6) scheme is 0.635 and the Rc for encoding/decoding level 2 bits for the MLC+MSD (4,6) scheme is 1 (all of the level 2 bits are uncoded). Using these Rc values, the coded BLER values may drop to lower values in scenarios where the SNR is greater than 26. Similarly, leaving the level 2 bits uncoded may produce a compromised slope as shown, which does not drop as cleanly as the slope for the coded level 1 bits. Additional test Rc values for encoding/decoding the level 1 bits may be simulated to determine a highest Rc value for encoding/decoding the level 1 bits where the uncoded level 2 BLER may have a better SNR ratio as compared to the coded level 1 BLER. Determining this value may reveal a lower functional SNR threshold that the MLC+MSD (4,6) scheme operates at with low coded BLER values.

For different labeling (i.e., different numbers of bits in level 1 vs. level 2 in an MLC+MSD scheme), the BER gap may be different, as shown in plot graphs 1010 and 1020, and the BLER values may also be different, as shown in plot graph 1100. With a proper selection of bit labeling subset sizes and code rates set for the first level (which may correspond to the working SNR point), it may be possible to leave the second level completely uncoded without significantly impacting the SE.

Since bits in level 2 may not be coded in the simulated MLC+MSD schemes illustrated in FIGS. 10A, 10B, and 11, power may be saved by not using resources to encode/decode level 2 bits. A theoretical power saving potential may be estimated by comparing a theoretical MLC+MSD (6,4) scheme where all of the level 2 bits are uncoded against a theoretical BICM scheme where all of the bits are coded. For example, an equivalent code rate for such a theoretical MLC+MSD (6,4) scheme may be calculated as $(6/10)*0.368+(4/10)*1=0.62$. Assuming N information bits, a theoretical BICM scheme may encode the N information bits into $(1/0.62)*N=1.61N$ coded bits at a code rate of Rc=0.62, as all bits of a BICM scheme may be encoded. To match the size between the theoretical MLC+MSD (6,4) scheme and theoretical BICM scheme (i.e., the same N information bits are transmitted) and also assuming the same number of channel resources occupied (i.e., same number of coded bits in the comparison), the MLC+MSD level 1 may carry $1.61N*(6/10)=0.966N$ coded bits. Thus, the theoretical MLC+MSD (6,4) scheme may encode $0.966*N*(0.368) =0.366N$ information bits for the level 1, while level 2 will carry additional $1.61N*(4/10)=0.644N$ un-coded information bits. The theoretical reduction in power using the theoretical MLC+MSD (6,4) scheme instead of the theoretical BICM scheme may then be $1-(0.996/1.61)=38\%$ theoretical reduction in power.

While the theoretical examples discussed above refer to MLC+MSD schemes where the highest level is completely uncoded, power may also be saved by using encoders/decoders for one level that uses lower complexity code than encoders/decoders for another level. Using such schemes, MLC+PID schemes may be used, which may be particularly useful where devices transmit data under channel conditions that closely match a fading channel model. Using a lower complexity code may also allow MLC+MSD schemes to operate under even lower SNR ranges, which may correspond to lower constellation orders. While using a lower complexity code may degrade a performance of the encoding and/or decoding of bits, such a performance sacrifice may be deemed worthwhile if a minimum threshold battery savings is achieved, and the performance does not degrade to be below a threshold performance level.

The level of complexity of an encoder and/or a decoder may be configured to be at a lower level in a variety of ways. For example, component code for an encoder may be a lower complexity code type that may be focused mainly on a higher Rc than in another encoder. Component code for a decoder may be a lower complexity code type that may be focused mainly on a higher Rc than in another decoder. Encoding for an encoder may be performed using a lower number of iterations (e.g., 1 or 2) than in another encoder. Decoding for a decoder may be performed using a lower number of iterations than in another decoder. An encoding for an encoder may be performed using one or more hard bits. A decoding for a decoder may be performed using one or more hard bits. A combination of any of the aforementioned methods to lower a level of complexity in an encoder and/or decoder may be used.

A system may also configure the use of MLC schemes for transmitting and receiving channel code to be dynamic based on channel conditions. For example, a system may use an MLC+MSD scheme under channel conditions that closely match an AWGN channel model, while using an MLC+PID scheme under channel conditions that closely match a fading channel model. The system may also, or alternatively, configure the use of MLC schemes for transmitting and receiving channel code to be dynamic based on an estimated working SNR point. For example, where the SE loss increases to be equal to or above a threshold level, the system may retreat to use a non-MLC scheme (e.g., a BICM scheme) to ensure that the SE performance loss when using the MLC scheme remains below the threshold level. Alternatively or additionally, where the SE loss increases to be equal to or above a threshold level, a receiving device may transmit to a transmitting device an indication to not use a MLC scheme that increases the SE loss. Such systems may be used for mid-high order constellations. Variables, such as an SE performance loss, a working SNR point, and minimum SNR values may be estimated using lookup tables saved on a memory of a system, such as a UE or a BS. The lookup table may be dynamically updated, for example by a periodic estimation performed by pilot signals transmitted during non-peak hours. Known theoretical results may illustrate that at least four soft coded bits may be used for flat channels, and at least six soft coded bits may be used for fading channels to at least match with non-MLC scheme performance (e.g., a BICM scheme). However, less soft coded bits may be used to allow for some SE loss in favor of additional reductions in power consumption.

FIG. 1200 shows a network connection flow diagram 1200 illustrating a first wireless device 1202, such as a UE or a BS, that receives an encoded transmission from a second wireless device 1204, such as another UE or another BS. In other words, a UE may be configured to receive a wireless encoded transmission from another UE, a UE may be configured to receive a wireless encoded transmission from a BS, a BS may be configured to receive a wireless encoded transmission from a UE, or a BS may be configured to receive a wireless encoded transmission from another BS.

The second wireless device 1204 may configure 1208 an MLC scheme to for a transmission to the first wireless device 1202. The configuration may use any of the systems or methods disclosed herein, for example by configuring a 2 level MLC+MSD scheme, such as the one shown in FIG. 6 or by configuring a 2 level MLC+PID scheme, such as the one shown in FIG. 9. The second wireless device 1208 may configure the MLC scheme on the basis of lookup table values saved to a memory of the second wireless device 1208, or received from the first wireless device 1202 via an MLC scheme configuration communication 1210. For example, the second wireless device 1208 may include a BS that retrieved a lookup table from a master database, or performed pilot metrics during a non-peak time period to generate estimated values for the lookup table with and between a variety of wireless devices. Alternatively or additionally, the second wireless device 1208 may include a UE and the first wireless device 1202 may include a BS, and the first wireless device 1202 may transmit a lookup table or a lookup table value via an MLC scheme configuration communication 1210. Such a lookup table may be periodically updated using estimated metrics via pilot transmissions or simulations whose variables may be updated dynamically. The second wireless device 1204 and the first wireless device 1202 may generate lookup table variable values by configuring 1206, 1208 the MLC scheme cooperatively by sending pilot signals to one another via MLC scheme configuration communications 1210.

Any of the disclosed MLC schemes may be implemented based upon data such as SE loss, power consumption savings, working SNR points, channel conditions, and/or BER/BLER values. For example, a (4,6) MLC+MSD scheme may be used based on an estimated working SNR point between the first wireless device 1202 and the second wireless device 1204 being above a threshold value, and a (6,4) MLC+MSD scheme may be used based on the estimated working SNR point dynamically falling to be below the threshold value.

The configured MLC scheme may be communicated to the first wireless device 1202 in a variety of matters. For example, the first wireless device 1202 may use a lookup table to configure 1206 an MLC scheme between the first wireless device 1202 and the second wireless device 1204 and communicate that scheme to the second wireless device 1204 via the MLC scheme configuration communication 1210. Alternatively or additionally, the second wireless device 1202 may use a lookup table to configure 1208 an MLC scheme between the first wireless device 1202 and the second wireless device 1204 and communicate that scheme to the first wireless device 1202 via the MLC scheme configuration communication 1210. The second wireless device 1204 may configure 1208 the MLC scheme to estimate whether to encode at least one second bit of the second level of bits using a lower complexity level than that used to encode at least one first bit of the first level of bits.

The second wireless device 1204 may be configured to transmit an indication via an MLC scheme configuration communication 1210 to the first wireless device 1202 what complexity code the first wireless device may use to decode the at least one bit of the second level of bits (e.g., the first level of complexity or the second level of complexity). The second wireless device 1204 may also be configured to transmit an indication via an MLC scheme configuration communication 1210 to the first wireless device 1202 what complexity code the first wireless device may use to decode the at least one bit of the first level of bits. The indication may be transmitted using a variety of different messaging means, such as DCI, a medium access control (MAC) control element (MAC-CE), or an RRC message. The indication may even be transmitted before the encoded transmission is sent to the first wireless device 1202, such as during a handshake communication transaction between the first wireless device 1202 and the second wireless device 1204, when the first wireless device 1202 first communicates with the second wireless device 1204, or as a part of a periodic MLC configuration task cyclically performed by the second wireless device 1204. The indication may include aspects of the MLC scheme, such as a number of bits for the first level, a number of bits for the second level, a signal constellation map, a code rate for an encoding/decoding level, an identifier of an encoding/decoding algorithm, a code rate for the first level, and/or a code rate for the second level.

The second wireless device 1204 may encode 1212 at least one first bit of the first level and at least one second bit of the second level in accordance with the configured MLC scheme. The second wireless device 1204 may encode the at least one first bit of the MLC scheme using the first level of complexity and encode the at least one second bit of the MLC scheme using the second level of complexity or the first level of complexity based on the estimation, where the second level of complexity is a lower level than the first level of complexity. The second wireless device 1204 may transmit 1214 the encoded at least one first bit and the encoded at least one second bit to the first wireless device 1202. The encoded message may include any suitable message, such as control data, or a HARQ retransmission. The first wireless device 1202 may then decode 1216 the encoded at least one first bit of the first level and the at least one second bit of the second level in accordance with the configured MLC scheme. The first wireless device 1202 may decode the at least one first bit of the MLC scheme corresponding to the first level using a decoder of a first level of complexity, and may decode, upon decoding the at least one first bit, the at least one second bit of the MLC scheme using a decoder of a second level of complexity if the at least one second bit is coded using a coder of the second level of complexity and using the decoder of the first level of complexity if the at least one second bit is coded using a coder of the first level of complexity.

Figure 13:
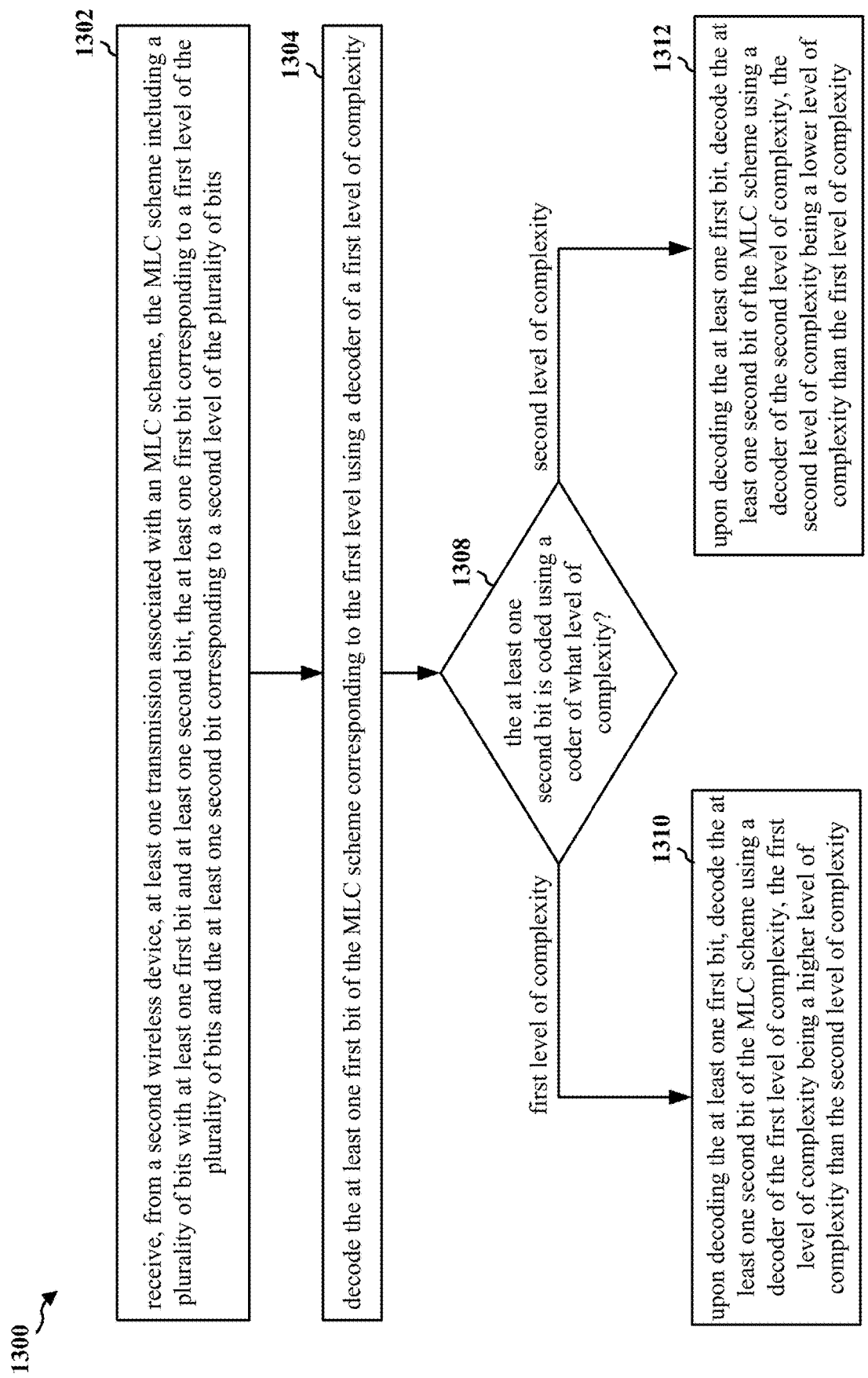
FIG. 13 is a flowchart of a method of receiving wireless communication at a wireless device, in accordance with various aspects of the present disclosure.

FIG. 13 is a flowchart 1300 of a method of wireless communication at a first wireless device. The method may be performed by any wireless device, such as the UE 104, the BS 102, the BS 180, the receiving device 530, the receiving device 630, the receiving device 830, the receiving device 930, the wireless device 1202, the apparatus 1502, or the apparatus 1602. The method may enable the first wireless device to decode bits in accordance with an MLC scheme to save power by selectively using low complexity code on a portion of an incoming transmission.

At 1302, the first wireless device may receive, from a second wireless device, at least one transmission associated with an MLC scheme, the MLC scheme including a plurality of bits with at least one first bit and at least one second bit, the at least one first bit corresponding to a first level of the plurality of bits and the at least one second bit corresponding to a second level of the plurality of bits. For example, the receiving device 630 in FIG. 6 may receive, from the transmitting device 610, at least one transmission 632 associated with an MLC scheme. The MLC scheme may include a plurality of bits with at least one first bit and at least one second bit, the at least one first bit corresponding to a first level of the plurality of bits, such as the first two bits of the constellation points for the constellation 400 shown in FIG. 4, and the at least one second bit corresponding to a second level of the plurality of bits, such as the last two bits of the constellation points for the constellation 400 shown in FIG. 4. Further, 1302 may be performed by reception component 1530 in FIG. 15 or reception component 1630 in FIG. 16.

At 1304, the first wireless device may decode the at least one first bit of the MLC scheme corresponding to the first level using a decoder of a first level of complexity. For example, the receiving device 630 in FIG. 6 may decode the encoded component code N1 using a decoder R1 645. Further, 1304 may be performed by MLC scheme decoding component 1544 in FIG. 15 or MLC scheme decoding component 1644 in FIG. 16.

Figure 12:
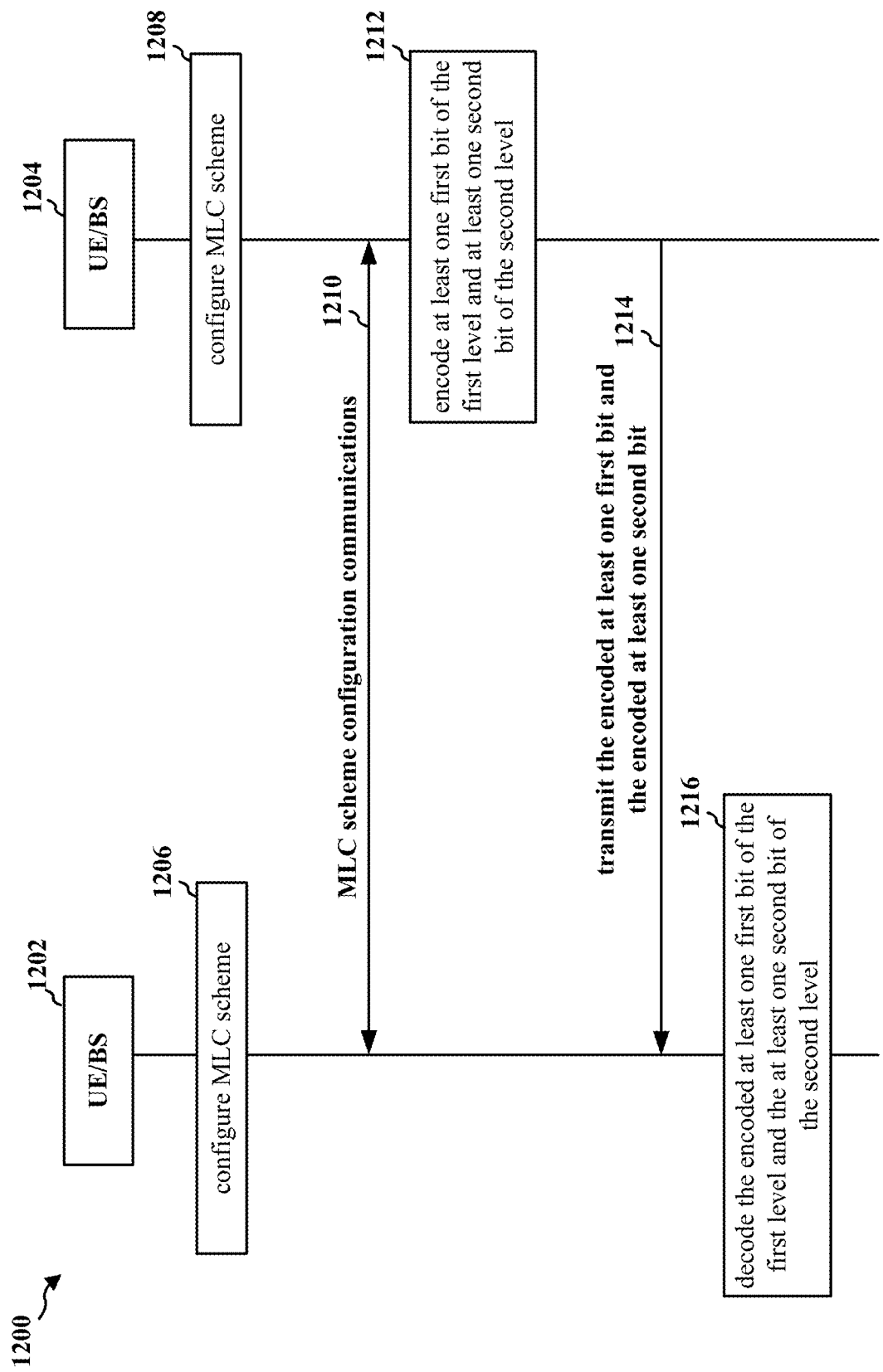
FIG. 12 is a network connection flow diagram that illustrates a UE/BS that encodes bits in accordance with a configured MLC scheme, and decodes bits in accordance with a configured MLC scheme.

At 1308, the first wireless device may determine the level of complexity with which the at least one second bit was coded. For example, the wireless device 1202 in FIG. 12 may configure its 1206 MLC scheme by using a lookup table or by receiving an indication from the wireless device 1204 via the MLC scheme configuration communication 1210. Further, 1308 may be performed by MLC scheme configuration component 1540 in FIG. 15 or MLC scheme configuration component 1640 in FIG. 16.

At 1310, upon decoding the at least one first bit, the first wireless device may decode the at least one second bit of the MLC scheme using a decoder of the first level of complexity if the first level of complexity was used to code the at least one second bit of the MLC scheme, the first level of complexity being a higher level of complexity than the second level of complexity. For example, the receiving device 630 in FIG. 6 may decode N2 using the decoder R2 646. Further, 1310 may be performed by MLC scheme decoding component 1544 in FIG. 15 or MLC scheme decoding component 1644 in FIG. 16.

At 1312, upon decoding the at least one first bit, the first wireless device may decode the at least one second bit of the MLC scheme using a decoder of the second level of complexity if the second level of complexity was used to code the at least one second bit of the MLC scheme, the second level of complexity being a lower level of complexity than the first level of complexity. For example, the receiving device 630 in FIG. 6 may decode N2 using the decoder R3 647. Further, 1312 may be performed by MLC scheme decoding component 1544 in FIG. 15 or MLC scheme decoding component 1644 in FIG. 16.

In some aspects, the decoder of the first level of complexity may include a channel code decoder, and the decoder of the second level of complexity may not include the channel code decoder. For example, the decoder R1 645 of FIG. 6 may have a channel code decoder and the decoder R3 647 may not have a channel code decoder, or may be just a wire.

In some aspects, the first level of complexity may include using a first channel code decoder to decode the at least one first bit of the MLC scheme, and the second level of complexity may include using a second channel code decoder to decode the at least one first bit of the MLC scheme, where the first channel code decoder has a high level of complexity and the second channel code decoder has a low level of complexity. For example, the decoder R1 645 of FIG. 6 may be used to decode the encoded component code N1, and the decoder R3 647 may be used to decode the encoded component code N2.

In some aspects, the at least one second bit of the MLC scheme may be coded using one or more of hard coded bits, a reduced number of iterations, or a high code rate. For example, the encoder R3 627 of FIG. 6 may encode K2 using one or more of hard coded bits, a reduced number of iterations, or a high code rate.

In some aspects, the receiving device may receive, from the second wireless device, an indication of whether the at least one second bit is coded using the first level of complexity or the second level of complexity. For example, the wireless device 1204 of FIG. 12 may transmit 1210 an MLC scheme configuration communication containing an indication of whether the at least one second bit is coded using the first level of complexity or the second level of complexity.

In some aspects, the indication may be received via at least one of DCI, a MAC-CE, or an RRC message. For example, the wireless device 1204 of FIG. 12 may transmit 1210 an MLC scheme configuration communication containing an indication as at least one of a DCI, a MAC-CE, or an RRC message.

In some aspects, the at least one of the DCI, the MAC-CE, or the RRC message may be received before receiving the at least one transmission associated with the MLC scheme. For example, the wireless device 1204 of FIG. 12 may transmit 1210 an MLC scheme configuration communication containing the indication as at least one of a DCI, a MAC-CE, or an RRC message before the wireless device 1204 may transmit 1214 the encoded at least one first bit and the encoded at least one second bit to the wireless device 1202.

In some aspects, the indication may include at least one of a code rate for the first level of the plurality of bits or the second level of the plurality of bits or an amount of bits of the first level of the plurality of bits or the second level of the plurality of bits. For example, the wireless device 1204 of FIG. 12 may transmit 1210 an MLC scheme configuration communication containing an indication that includes at least one of a code rate for the first level of the plurality of bits or the second level of the plurality of bits or an amount of bits of the first level of the plurality of bits or the second level of the plurality of bits.

In some aspects, the MLC scheme may be associated with MSD. For example, an MLC scheme using the transmitting device 610 and the receiving device 630 of FIG. 6.

In some aspects, the MLC scheme is associated with PID. For example, an MLC scheme using the transmitting device 910 and the receiving device 930 of FIG. 9.

In some aspects, the MLC scheme may be associated with a lower level of decoding complexity of the plurality of bits compared to a BICM scheme. For example, the decoder R1 645 of FIG. 6 may use a level of complexity higher than the level of complexity used by the decoder R2 647.

In some aspects, the first level of the plurality of bits may have a lower number of bits compared to the second level of the plurality of bits if a measured SNR between the first wireless device and the second wireless device is above a threshold level. For example, a wireless device may use the MLC-MSD (4,6) schema theoretically modeled in plot graph 1010 of FIG. 10A if the measured SNR between the wireless devices is above 20.

In some aspects, the first level of the plurality of bits may have a higher number of bits compared to the second level of the plurality of bits if a measured SNR between the first wireless device and the second wireless device is below a threshold level. For example, a wireless device may use the MLC-MSD (6,4) schema theoretically modeled in plot graph 1020 of FIG. 10B if the measured SNR between the wireless devices is below 16.

In some aspects, the at least one transmission associated with the MLC scheme includes control data or the at least one transmission associated with the MLC control scheme includes at least one HARQ retransmission. For example, the wireless device 1204 of FIG. 12 may transmit 1214 the encoded at least one first bit and the encoded at least one second bit as a control data or a HARQ transmission.

In some aspects, a transceiver may be coupled to the at least one processor. For example, the transceiver 1522 in FIG. 15.

In some aspects, the first wireless device may include a UE and the second wireless device may include a BS. For example, the first wireless device 1202 in FIG. 12 may be a UE and the second wireless device 1204 may be a BS.

Figure 14:
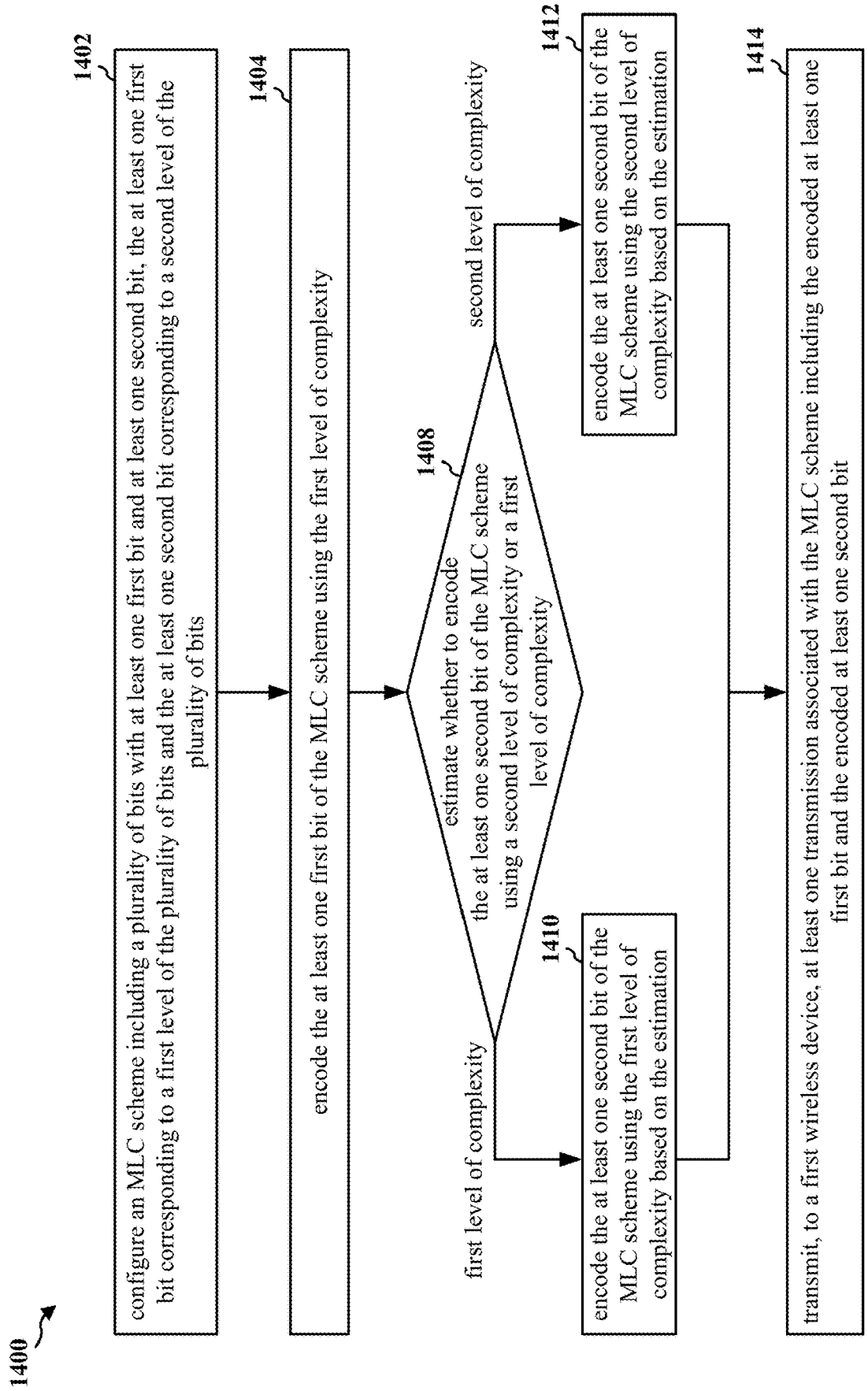
FIG. 14 is a flowchart of a method of transmitting wireless communication at a wireless device, in accordance with various aspects of the present disclosure.

FIG. 14 is a flowchart 1400 of a method of wireless communication at a second wireless device. The method may be performed by any wireless device, such as the UE 104, the BS 102, the BS 180, the transmitting device 510, the transmitting device 610, the transmitting device 810, the transmitting device 910, the wireless device 1204, the apparatus 1502, or the apparatus 1602. The method may enable the second wireless device to encode bits in accordance with an MLC scheme to save power by selectively using low complexity code on a portion of an outgoing transmission.

At 1402, the second wireless device may configure an MLC scheme including a plurality of bits with at least one first bit and at least one second bit, the at least one first bit corresponding to a first level of the plurality of bits and the at least one second bit corresponding to a second level of the plurality of bits. For example, the receiving device 630 in FIG. 6 may receive, from the transmitting device 610, at least one transmission 632 associated with an MLC scheme. The MLC scheme may include a plurality of bits with at least one first bit and at least one second bit, the at least one first bit corresponding to a first level of the plurality of bits, such as the first two bits of the constellation points for the constellation 400 shown in FIG. 4, and the at least one second bit corresponding to a second level of the plurality of bits, such as the last two bits of the constellation points for the constellation 400 shown in FIG. 4. Further, 1402 may be performed by MLC scheme configuration component 1540 in FIG. 15 or MLC scheme configuration component 1640 in FIG. 16.

At 1404, the second wireless device may encode the at least one first bit of the MLC scheme using the first level of complexity. For example, the transmitting device 610 in FIG. 6 may encode K1 using an encoder R1 621. Further, 1404 may be performed by MLC scheme encoding component 1542 in FIG. 15 or MLC scheme encoding component 1642 in FIG. 16.

At 1408, the second wireless device may estimate whether to encode the at least one second bit of the MLC scheme using a second level of complexity or a first level of complexity. For example, the wireless device in FIG. 14 may estimate whether to encode the at least one second bit of the MLC scheme using a second level of complexity or a first level of complexity when configuring 1208 the MLC scheme. Further, 1408 may be performed by MLC scheme encoding component 1542 in FIG. 15 or MLC scheme encoding component 1642 in FIG. 16.

At 1410, the second wireless device may encode the at least one second bit of the MLC scheme using the first level of complexity based on the estimation. For example, the wireless device in FIG. 14 may encode the at least one second bit of the MLC scheme using the first level of complexity based on the estimation. Further, 1410 may be performed by MLC scheme encoding component 1542 in FIG. 15 or MLC scheme encoding component 1642 in FIG. 16.

At 1412, the second wireless device may encode the at least one second bit of the MLC scheme using the second level of complexity based on the estimation. For example, the wireless device in FIG. 14 may encode the at least one second bit of the MLC scheme using the second level of complexity based on the estimation. Further, 1412 may be performed by MLC scheme encoding component 1542 in FIG. 15 or MLC scheme encoding component 1642 in FIG. 16.

At 1414, the second wireless device may transmit, to a first wireless device, at least one transmission associated with the MLC scheme including the encoded at least one first bit and the encoded at least one second bit. For example, the wireless device in FIG. 14 may transmit 1214 the encoded at least one first bit and the encoded at least one second bit. Further, 1414 may be performed by transmission component 1534 in FIG. 15 or transmission component 1634 in FIG. 16.

In some aspects, the at least one first bit or the at least one second bit may be encoded using the first level of complexity with a channel code encoder and the at least one second bit may be encoded using the second level of complexity without the channel code encoder. For example, K1 in FIG. 6 may be encoded using the encoder R1 621 using the first level of complexity with a channel code encoder and K2 may be encoded using the encoder R3 627 using the second level of complexity without the channel code encoder.

In some aspects, to encode the at least one second bit using the second level of complexity may include encoding the at least one second bit using a low complexity channel code encoder having a low complexity code compared to a high complexity channel code encoder used to encode the at least one first bit. For example, the encoder R1 621 in FIG. 6 may be used to encode K1 using a high complexity code and the encoder R3 627 may be used to encode K2 using a low complexity code.

In some aspects, the second wireless device may transmit, to the first wireless device, an indication of whether the at least one second bit is encoded using the second level of complexity or the first level of complexity. For example, the wireless device 1204 of FIG. 12 may transmit 1210 an MLC scheme configuration communication containing an indication of whether the at least one second bit is coded using the first level of complexity or the second level of complexity.

In some aspects, the indication may be transmitted via at least one of DCI) a MAC-CE, or an RRC message. For example, the wireless device 1204 of FIG. 12 may transmit 1210 an MLC scheme configuration communication containing an indication as at least one of a DCI, a MAC-CE, or an RRC message.

In some aspects, the indication may be transmitted to the first wireless device before the at least one transmission is transmitted to the first wireless device. For example, the wireless device 1204 of FIG. 12 may transmit 1210 an MLC scheme configuration communication containing the indication as at least one of a DCI, a MAC-CE, or an RRC message before the wireless device 1204 may transmit 1214 the encoded at least one first bit and the encoded at least one second bit to the wireless device 1202.

In some aspects, the MLC scheme may be associated with MSD. For example, an MLC scheme using the transmitting device 610 and the receiving device 630 of FIG. 6.

In some aspects, the MLC scheme may be associated with PID. For example, an MLC scheme using the transmitting device 910 and the receiving device 930 of FIG. 9.

In some aspects, the MLC scheme may be associated with a lower level of decoding complexity of the plurality of bits compared to a BICM scheme. For example, the decoder R1 645 of FIG. 6 may use a level of complexity higher than the level of complexity used by the decoder R2 647.

In some aspects, the first level of the plurality of bits has a lower number of bits compared to the second level of the plurality of bits if a measured SNR between the first wireless device and the second wireless device is above a threshold level. For example, a wireless device may use the MLC-MSD (4,6) schema theoretically modeled in plot graph 1010 of FIG. 10A if the measured SNR between the wireless devices is above 20.

In some aspects, the second wireless device may include a transceiver. For example, the transceiver 1522 in FIG. 15.

In some aspects, the first level of the plurality of bits may have a higher number of bits compared to the second level of the plurality of bits if a measured SNR between the first wireless device and the second wireless device is below a threshold level. For example, a wireless device may use the MLC-MSD (6,4) schema theoretically modeled in plot graph 1020 of FIG. 10B if the measured SNR between the wireless devices is below 16.

Figure 15:
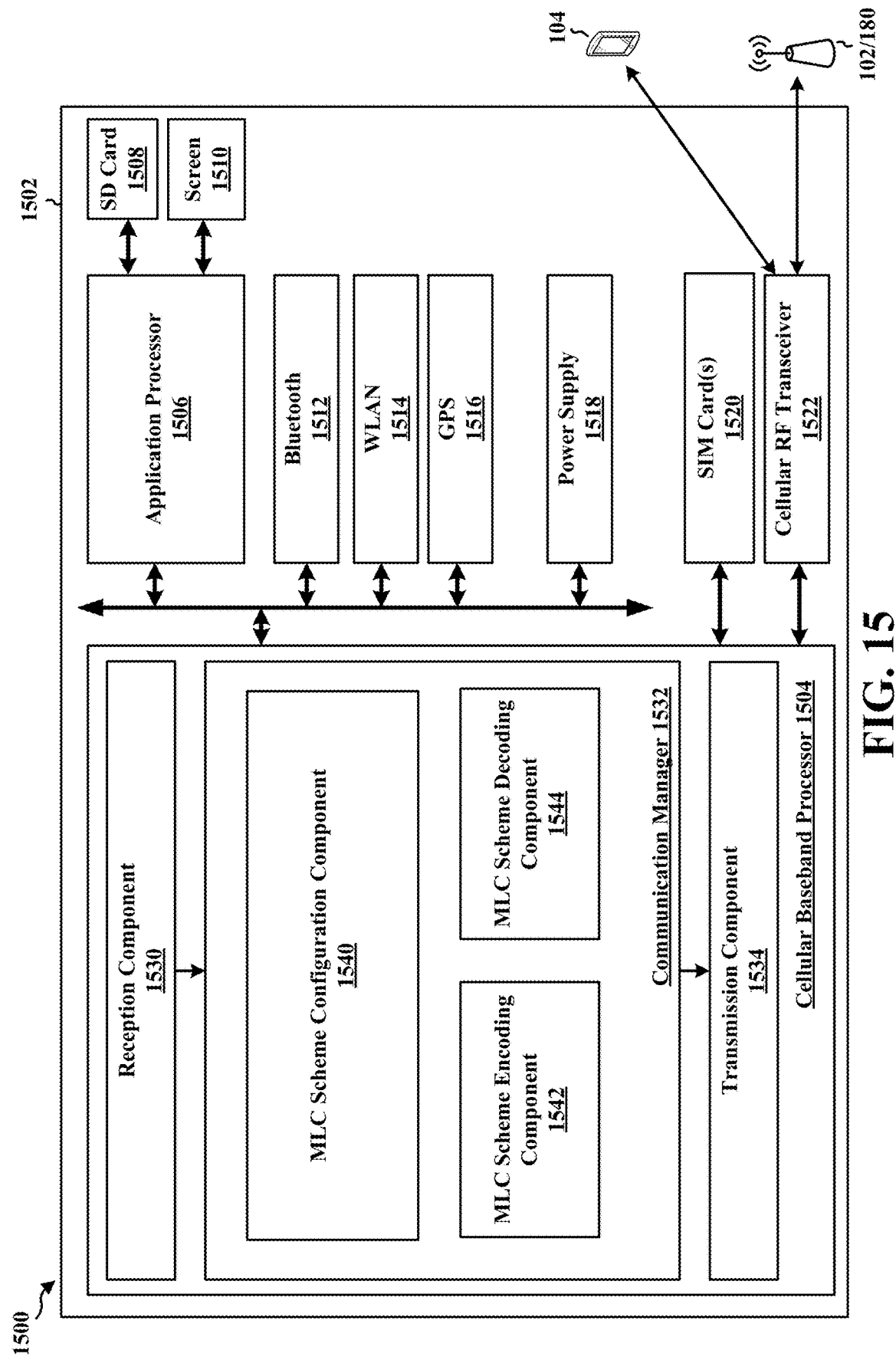
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes an MLC scheme configuration component 1540 that is configured to configure an MLC scheme for transmitting and/or receiving encoded transmissions with another wireless device, e.g., as described in connection with step 1308 of FIG. 13 or step 1408 of FIG. 14. The communication manager 1532 further includes an MLC scheme encoding component 1542 that receives input in the form of a plurality of bits from the component 1540 and is configured to encode the at least one first bit of the MLC scheme corresponding to a first level of the plurality of bits and encode the at least one second bit of the MLC scheme corresponding to a second level of the plurality of bits, e.g., as described in connection with steps 1404, 1410, and 1412 of FIG. 14. The communication manager 1532 further includes an MLC scheme decoding component 1544 that receives input in the form of a plurality of encoded bits from the component 1540 and is configured to decode at least one first bit of the MLC scheme corresponding to a first level of the plurality of bits and decode at least one second bit of the MLC scheme corresponding to a second level of the plurality of bits, e.g., as described in connection with steps 1304, 1310, and 1312 of FIG. 13.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for receiving, from a second wireless device, at least one transmission associated with a multi-level coding (MLC) scheme, the MLC scheme including a plurality of bits with at least one first bit and at least one second bit, the at least one first bit corresponding to a first level of the plurality of bits and the at least one second bit corresponding to a second level of the plurality of bits; means for decoding the at least one first bit of the MLC scheme corresponding to the first level using a decoder of a first level of complexity; and means for decoding, upon decoding the at least one first bit, the at least one second bit of the MLC scheme using a decoder of a second level of complexity if the at least one second bit is coded using a coder of the second level of complexity and using the decoder of the first level of complexity if the at least one second bit is coded using a coder of the first level of complexity, the first level of complexity being a higher level of complexity than the second level of complexity. In another configuration, the apparatus 1502, and in particular the cellular baseband processor 1504, includes means for configuring a multi-level coding (MLC) scheme including a plurality of bits with at least one first bit and at least one second bit, the at least one first bit corresponding to a first level of the plurality of bits and the at least one second bit corresponding to a second level of the plurality of bits; means for estimating whether to encode the at least one second bit of the MLC scheme using a second level of complexity or a first level of complexity, the first level of complexity being a higher level of complexity than the second level of complexity; means for encoding the at least one first bit of the MLC scheme using the first level of complexity; means for encoding the at least one second bit of the MLC scheme using the second level of complexity or the first level of complexity based on the estimation; and means for transmitting, to a first wireless device, at least one transmission associated with the MLC scheme including the encoded at least one first bit and the encoded at least one second bit. The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
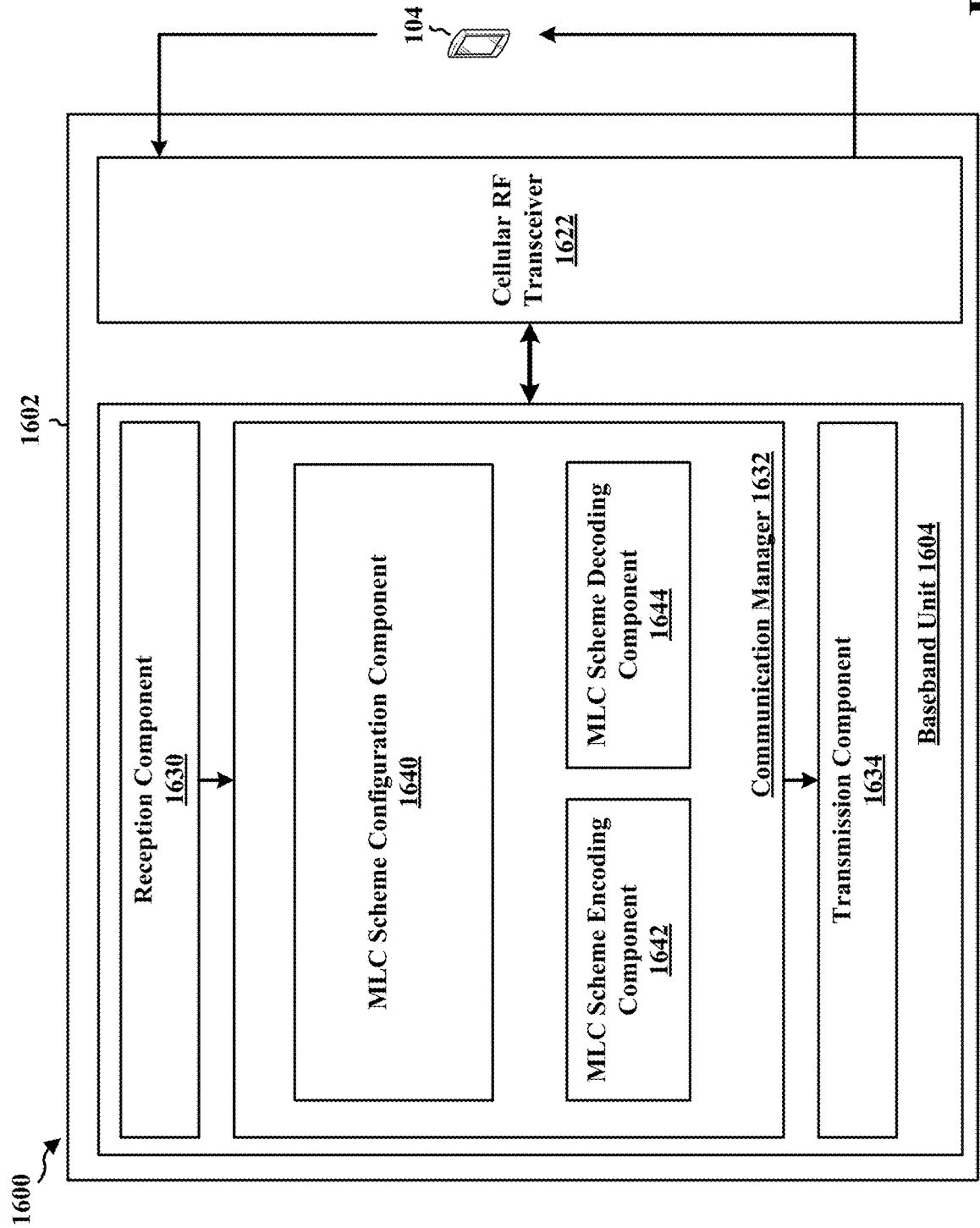
FIG. 16 is a diagram illustrating another example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1502 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes an MLC scheme configuration component 1640 that configures an MLC scheme for transmitting and/or receiving encoded transmissions with another wireless device, e.g., as described in connection with step 1308 of FIG. 13 or step 1408 of FIG. 14. The communication manager 1632 further includes an MLC scheme encoding component 1642 that receives input in the form of a plurality of bits from the component 1540 and is configured to encode the at least one first bit of the MLC scheme corresponding to a first level of the plurality of bits and encode the at least one second bit of the MLC scheme corresponding to a second level of the plurality of bits, e.g., as described in connection with steps 1404, 1410, and 1412 of FIG. 14. The communication manager 1632 further includes an MLC scheme decoding component 1644 that receives input in the form of a plurality of encoded bits from the component 1540 and is configured to decode at least one first bit of the MLC scheme corresponding to a first level of the plurality of bits and decode at least one second bit of the MLC scheme corresponding to a second level of the plurality of bits, e.g., as described in connection with steps 1304, 1310, and 1312 of FIG. 13.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for receiving, from a second wireless device, at least one transmission associated with a multi-level coding (MLC) scheme, the MLC scheme including a plurality of bits with at least one first bit and at least one second bit, the at least one first bit corresponding to a first level of the plurality of bits and the at least one second bit corresponding to a second level of the plurality of bits; means for decoding the at least one first bit of the MLC scheme corresponding to the first level using a decoder of a first level of complexity; and means for decoding, upon decoding the at least one first bit, the at least one second bit of the MLC scheme using a decoder of a second level of complexity if the at least one second bit is coded using a coder of the second level of complexity and using the decoder of the first level of complexity if the at least one second bit is coded using a coder of the first level of complexity, the first level of complexity being a higher level of complexity than the second level of complexity. In another configuration, the apparatus 1602, and in particular the baseband unit 1604, includes means for configuring a multi-level coding (MLC) scheme including a plurality of bits with at least one first bit and at least one second bit, the at least one first bit corresponding to a first level of the plurality of bits and the at least one second bit corresponding to a second level of the plurality of bits; means for estimating whether to encode the at least one second bit of the MLC scheme using a second level of complexity or a first level of complexity, the first level of complexity being a higher level of complexity than the second level of complexity; means for encoding the at least one first bit of the MLC scheme using the first level of complexity; means for encoding the at least one second bit of the MLC scheme using the second level of complexity or the first level of complexity based on the estimation; and means for transmitting, to a first wireless device, at least one transmission associated with the MLC scheme including the encoded at least one first bit and the encoded at least one second bit. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

The disclosed wireless devices may be used to reduce power consumption when encoding and/or decoding transmissions with other wireless devices. Such systems may use a great deal of power to encode and/or decode transmissions, particularly when decoding transmissions. By configuring a wireless device to utilize different types of MLC schemes to encode and/or decode wireless transmissions, power consumption can be saved when encoding and/or decoding transmissions by selectively encoding and/or decoding component codes using lower levels of complexity without sacrificing much SE, and in some cases even improving on SE.

In an aspect of the disclosure, an apparatus for wireless communication at a first wireless device may include a memory and at least one processor coupled to the memory. The at least one processor may be configured to receive, from a second wireless device, at least one transmission associated with a multi-level coding (MLC) scheme, the MLC scheme including a plurality of bits with at least one first bit and at least one second bit, the at least one first bit corresponding to a first level of the plurality of bits and the at least one second bit corresponding to a second level of the plurality of bits. The at least one processor may be further configured to decode the at least one first bit of the MLC scheme corresponding to the first level using a decoder of a first level of complexity. The at least one processor may be further configured to decode, upon decoding the at least one first bit, the at least one second bit of the MLC scheme using a decoder of a second level of complexity if the at least one second bit is coded using a coder of the second level of complexity and using the decoder of the first level of complexity if the at least one second bit is coded using a coder of the first level of complexity, the first level of complexity being a higher level of complexity than the second level of complexity.

In another aspect of the disclosure, an apparatus for wireless communication at a second wireless device may include a memory and at least one processor coupled to the memory. The processor may be configured to configure a multi-level coding (MLC) scheme including a plurality of bits with at least one first bit and at least one second bit, the at least one first bit corresponding to a first level of the plurality of bits and the at least one second bit corresponding to a second level of the plurality of bits. The processor may be further configured to estimate whether to encode the at least one second bit of the MLC scheme using a second level of complexity or a first level of complexity, the first level of complexity being a higher level of complexity than the second level of complexity. The processor may be further configured to encode the at least one first bit of the MLC scheme using the first level of complexity. The processor may be further configured to encode the at least one second bit of the MLC scheme using the second level of complexity or the first level of complexity based on the estimation. The processor may be further configured to transmit, to a first wireless device, at least one transmission associated with the MLC scheme including the encoded at least one first bit and the encoded at least one second bit.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a second wireless device, at least one transmission associated with a multi-level coding (MLC) scheme, the MLC scheme including a plurality of bits with at least one first bit and at least one second bit, the at least one first bit corresponding to a first level of the plurality of bits and the at least one second bit corresponding to a second level of the plurality of bits. The at least one processor may be further configured to decode the at least one first bit of the MLC scheme corresponding to the first level using a decoder of a first level of complexity. The at least one processor may be further configured to decode, upon decoding the at least one first bit, the at least one second bit of the MLC scheme using a decoder of a second level of complexity if the at least one second bit is coded using a coder of the second level of complexity and using the decoder of the first level of complexity if the at least one second bit is coded using a coder of the first level of complexity, the first level of complexity being a higher level of complexity than the second level of complexity.

Aspect 2 is the apparatus of aspect 1, where the decoder of the first level of complexity includes a channel code decoder, and the decoder of the second level of complexity does not include the channel code decoder.

Aspect 3 is the apparatus of any of aspects 1 and 2, where the first level of complexity includes using a first channel code decoder to decode the at least one first bit of the MLC scheme, and the second level of complexity includes using a second channel code decoder to decode the at least one first bit of the MLC scheme, where the first channel code decoder has a high level of complexity and the second channel code decoder has a low level of complexity.

Aspect 4 is the apparatus of any of aspects 1 to 3, where the at least one second bit of the MLC scheme is coded using one or more of hard coded bits, a reduced number of iterations, or a high code rate.

Aspect 5 is the apparatus of any of aspects 1 to 4, where the at least one processor coupled to the memory is further configured to receive, from the second wireless device, an indication of whether the at least one second bit is coded using the first level of complexity or the second level of complexity.

Aspect 6 is the apparatus of aspect 5, where the indication is received via at least one of downlink control information (DCI), a medium access control (MAC) control element (MAC-CE), or a radio resource control (RRC) message.

Aspect 7 is the apparatus of any of aspect 6, where the at least one of the DCI, the MAC-CE, or the RRC message is received before receiving the at least one transmission associated with the MLC scheme.

Aspect 8 is the apparatus of any of aspects 5 to 7, where the indication includes at least one of a code rate for the first level of the plurality of bits or the second level of the plurality of bits or an amount of bits of the first level of the plurality of bits or the second level of the plurality of bits.

Aspect 9 is the apparatus of any of aspects 1 to 8, where the MLC scheme is associated with MSD.

Aspect 10 is the apparatus of any of aspects 1 to 9, where the MLC scheme is associated with PID.

Aspect 11 is the apparatus of any of aspects 1 to 10, where the MLC scheme is associated with a lower level of decoding complexity of the plurality of bits compared to a BICM scheme.

Aspect 12 is the apparatus of any of aspects 1 to 11, where the first level of the plurality of bits has a lower number of bits compared to the second level of the plurality of bits if a measured SNR between the first wireless device and the second wireless device is above a threshold level.

Aspect 13 is the apparatus of any of aspects 1 to 12, where the first level of the plurality of bits has a higher number of bits compared to the second level of the plurality of bits if a measured SNR between the first wireless device and the second wireless device is below a threshold level.

Aspect 14 is the apparatus of any of aspects 1 to 13, where the at least one transmission associated with the MLC scheme includes control data or the at least one transmission associated with the MLC control scheme includes at least one HARQ retransmission.

Aspect 15 is the apparatus of any of aspects 1 to 14, further including a transceiver coupled to the at least one processor, where the first wireless device includes a UE and the second wireless device includes a BS.

Aspect 16 is the apparatus of any of aspects 1 to 15, where the at least one processor coupled to the memory is further configured to transmit, to the second wireless device, an indication to not code the at least one second bit based on a measured spectral efficiency loss in a transmission between the first wireless device and the second wireless device.

Aspect 17 is an apparatus for wireless communication including at least one processor coupled to a memory and configured to configure a multi-level coding (MLC) scheme including a plurality of bits with at least one first bit and at least one second bit, the at least one first bit corresponding to a first level of the plurality of bits and the at least one second bit corresponding to a second level of the plurality of bits. The at least one processor is further configured to estimate whether to encode the at least one second bit of the MLC scheme using a second level of complexity or a first level of complexity, the first level of complexity being a higher level of complexity than the second level of complexity. The at least one processor is further configured to encode the at least one first bit of the MLC scheme using the first level of complexity. The at least one processor is further configured to encode the at least one second bit of the MLC scheme using the second level of complexity or the first level of complexity based on the estimation. The at least one processor is further configured to transmit, to a first wireless device, at least one transmission associated with the MLC scheme including the encoded at least one first bit and the encoded at least one second bit.

Aspect 18 is the apparatus of aspect 17, where the at least one first bit or the at least one second bit is encoded using the first level of complexity with a channel code encoder and the at least one second bit is encoded using the second level of complexity without the channel code encoder.

Aspect 19 is the apparatus of any of aspects 17 and 18, where to encode the at least one second bit using the second level of complexity includes encoding the at least one second bit using a low complexity channel code encoder having a low complexity code compared to a high complexity channel code encoder used to encode the at least one first bit.

Aspect 20 is the apparatus of any of aspects 17 to 19, where the at least one processor coupled to the memory is further configured to transmit, to the first wireless device, an indication of whether the at least one second bit is encoded using the second level of complexity or the first level of complexity.

Aspect 21 is the apparatus of aspect 20, where the indication is transmitted via at least one of DCI, a MAC-CE, or an RRC message.

Aspect 22 is the apparatus of aspect 21, where the indication is transmitted to the first wireless device before the at least one transmission is transmitted to the first wireless device.

Aspect 23 is the apparatus of any of aspects 17 to 22, where the MLC scheme is associated with MSD.

Aspect 24 is the apparatus of any of aspects 17 to 23, where the MLC scheme is associated with PID.

Aspect 25 is the apparatus of any of aspects 17 to 24, where the MLC scheme is associated with a lower level of decoding complexity of the plurality of bits compared to a BICM scheme.

Aspect 26 is the apparatus of any of aspects 17 to 25, where the first level of the plurality of bits has a lower number of bits compared to the second level of the plurality of bits if a measured SNR between the first wireless device and the second wireless device is above a threshold level.

Aspect 27 is the apparatus of any of aspects 17 to 26, further including a transceiver coupled to the at least one processor, where the first level of the plurality of bits has a higher number of bits compared to the second level of the plurality of bits if a measured SNR between the first wireless device and the second wireless device is below a threshold level.

Aspect 28 is the apparatus of any of aspects 17 to 27, where estimating whether to code the at least one second bit using the second level of complexity is based on a measured spectral efficiency loss SNR point.

Aspect 29 is a method of wireless communication for implementing any of aspects 1 to 28.

Aspect 30 is an apparatus for wireless communication including means for implementing any of aspects 1 to 28.

Aspect 31 is a computer-readable medium storing computer executable code, where the code when executed by a processor causes the processor to implement any of aspects 1 to 28.

What is claimed is:

1. An apparatus for wireless communication at a first wireless device, comprising:
    a memory; and
    at least one processor coupled to the memory and configured to:
        receive, from a second wireless device, at least one transmission associated with a multi-level coding (MLC) scheme, the MLC scheme including a plurality of bits with at least one first bit and at least one second bit, the at least one first bit corresponding to a first level of the plurality of bits and the at least one second bit corresponding to a second level of the plurality of bits;
        decode the at least one first bit of the MLC scheme corresponding to the first level using a decoder of a first level of complexity; and
        decode, upon decoding the at least one first bit, the at least one second bit of the MLC scheme using a decoder of a second level of complexity if the at least one second bit is coded using a coder of the second level of complexity and using the decoder of the first level of complexity if the at least one second bit is coded using a coder of the first level of complexity, the first level of complexity being a higher level of complexity than the second level of complexity.

2. The apparatus of claim 1, wherein the decoder of the first level of complexity includes a channel code decoder, and the decoder of the second level of complexity does not include the channel code decoder.

3. The apparatus of claim 1, wherein the first level of complexity includes using a first channel code decoder to decode the at least one first bit of the MLC scheme, and the second level of complexity comprises using a second channel code decoder to decode the at least one first bit of the MLC scheme, wherein the first channel code decoder has a high level of complexity and the second channel code decoder has a low level of complexity.

4. The apparatus of claim 1, wherein the at least one second bit of the MLC scheme is coded using one or more of hard coded bits, a reduced number of iterations, or a high code rate.

5. The apparatus of claim 1, wherein the at least one processor coupled to the memory is further configured to receive, from the second wireless device, an indication of whether the at least one second bit is coded using the first level of complexity or the second level of complexity.

6. The apparatus of claim 5, wherein the indication is received via at least one of downlink control information (DCI), a medium access control (MAC) control element (MAC-CE), or a radio resource control (RRC) message.

7. The apparatus of claim 6, wherein the at least one of the DCI, the MAC-CE, or the RRC message is received before receiving the at least one transmission associated with the MLC scheme.

8. The apparatus of claim 5, wherein the indication includes at least one of:
    a code rate for the first level of the plurality of bits or the second level of the plurality of bits, or
    an amount of bits of the first level of the plurality of bits or the second level of the plurality of bits.

9. The apparatus of claim 1, wherein the MLC scheme is associated with multi-stage decoding (MSD).

10. The apparatus of claim 1, wherein the MLC scheme is associated with parallel independent decoding (PID).

11. The apparatus of claim 1, wherein the MLC scheme is associated with a lower level of decoding complexity of the plurality of bits compared to a bit-interleaved coded modulation (BICM) scheme.

12. The apparatus of claim 1, wherein the first level of the plurality of bits has a lower number of bits compared to the second level of the plurality of bits if a measured signal-to-noise ratio (SNR) between the first wireless device and the second wireless device is above a threshold level.

13. The apparatus of claim 1, wherein the first level of the plurality of bits has a higher number of bits compared to the second level of the plurality of bits if a measured SNR between the first wireless device and the second wireless device is below a threshold level.

14. The apparatus of claim 1, wherein the at least one transmission associated with the MLC scheme includes control data or the at least one transmission associated with the MLC control scheme includes at least one hybrid automatic repeat request (HARQ) retransmission.

15. The apparatus of claim 1, further comprising a transceiver coupled to the at least one processor, wherein the first wireless device comprises a user equipment (UE) and the second wireless device comprises a base station (BS).

16. The apparatus of claim 1, wherein the at least one processor coupled to the memory is further configured to transmit, to the second wireless device, an indication to not code the at least one second bit based on a measured spectral efficiency loss in a transmission between the first wireless device and the second wireless device.

17. An apparatus for wireless communication at a second wireless device, comprising:
a memory; and
at least one processor coupled to the memory and configured to:
configure a multi-level coding (MLC) scheme including a plurality of bits with at least one first bit and at least one second bit, the at least one first bit corresponding to a first level of the plurality of bits and the at least one second bit corresponding to a second level of the plurality of bits;
estimate whether to encode the at least one second bit of the MLC scheme using a second level of complexity or a first level of complexity, the first level of complexity being a higher level of complexity than the second level of complexity;
encode the at least one first bit of the MLC scheme using the first level of complexity;
encode the at least one second bit of the MLC scheme using the second level of complexity or the first level of complexity based on the estimation; and
transmit, to a first wireless device, at least one transmission associated with the MLC scheme including the encoded at least one first bit and the encoded at least one second bit.

18. The apparatus of claim 17, wherein the at least one first bit or the at least one second bit is encoded using the first level of complexity with a channel code encoder and the at least one second bit is encoded using the second level of complexity without the channel code encoder.

19. The apparatus of claim 17, wherein to encode the at least one second bit using the second level of complexity includes encoding the at least one second bit using a low complexity channel code encoder having a low complexity code compared to a high complexity channel code encoder used to encode the at least one first bit.

20. The apparatus of claim 17, wherein the at least one processor coupled to the memory is further configured to transmit, to the first wireless device, an indication of whether the at least one second bit is encoded using the second level of complexity or the first level of complexity.

21. The apparatus of claim 20, wherein the indication is transmitted via at least one of downlink control information (DCI), a medium access control (MAC) control element (MAC-CE), or a radio resource control (RRC) message.

22. The apparatus of claim 21, wherein the indication is transmitted to the first wireless device before the at least one transmission is transmitted to the first wireless device.

23. The apparatus of claim 17, wherein the MLC scheme is associated with multi-stage decoding (MSD).

24. The apparatus of claim 17, wherein the MLC scheme is associated with parallel independent decoding (PID).

25. The apparatus of claim 17, wherein the MLC scheme is associated with a lower level of decoding complexity of the plurality of bits compared to a bit-interleaved coded modulation (BICM) scheme.

26. The apparatus of claim 17, wherein the first level of the plurality of bits has a lower number of bits compared to the second level of the plurality of bits if a measured SNR between the first wireless device and the second wireless device is above a threshold level.

27. The apparatus of claim 17, further comprising a transceiver coupled to the at least one processor, wherein the first level of the plurality of bits has a higher number of bits compared to the second level of the plurality of bits if a measured SNR between the first wireless device and the second wireless device is below a threshold level.

28. The apparatus of claim 17, wherein estimating whether to code the at least one second bit using the second level of complexity is based on a measured spectral efficiency loss signal-to-noise ratio (SNR) point.

29. A method of wireless communication at a first wireless device, comprising:
receiving, from a second wireless device, at least one transmission associated with a multi-level coding (MLC) scheme, the MLC scheme including a plurality of bits with at least one first bit and at least one second bit, the at least one first bit corresponding to a first level of the plurality of bits and the at least one second bit corresponding to a second level of the plurality of bits;
decoding the at least one first bit of the MLC scheme corresponding to the first level using a decoder of a first level of complexity; and
decoding, upon decoding the at least one first bit, the at least one second bit of the MLC scheme using a decoder of a second level of complexity if the at least one second bit is coded using a coder of the second level of complexity and using the decoder of the first level of complexity if the at least one second bit is coded using a coder of the first level of complexity, the first level of complexity being a higher level of complexity than the second level of complexity.

30. A method of wireless communication at a second wireless device, comprising:
configuring a multi-level coding (MLC) scheme including a plurality of bits with at least one first bit and at least one second bit, the at least one first bit corresponding to a first level of the plurality of bits and the at least one second bit corresponding to a second level of the plurality of bits;
estimating whether to encode the at least one second bit of the MLC scheme using a second level of complexity or a first level of complexity, the first level of complexity being a higher level of complexity than the second level of complexity;
encoding the at least one first bit of the MLC scheme using the first level of complexity;
encoding the at least one second bit of the MLC scheme using the second level of complexity or the first level of complexity based on the estimation; and
transmitting, to a first wireless device, at least one transmission associated with the MLC scheme including the encoded at least one first bit and the encoded at least one second bit.

* * * * *